United States Patent
Kawamoto et al.

(10) Patent No.: US 7,557,883 B2
(45) Date of Patent: Jul. 7, 2009

(54) POLARIZING PLATE WITH OPTICAL COMPENSATION LAYER, METHOD OF PRODUCING THE SAME, AND LIQUID CRYSTAL PANEL, LIQUID CRYSTAL DISPLAY, AND IMAGE DISPLAY INCLUDING THE SAME

(75) Inventors: Ikuo Kawamoto, Ibaraki (JP); Hideyuki Yonezawa, Ibaraki (JP); Kazuya Hada, Ibaraki (JP); Shunsuke Shutou, Ibaraki (JP); Tsuyoshi Chiba, Ibaraki (JP); Naoki Takahashi, Ibaraki (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 207 days.

(21) Appl. No.: 11/776,637

(22) Filed: Jul. 12, 2007

(65) Prior Publication Data
US 2008/0049179 A1 Feb. 28, 2008

(30) Foreign Application Priority Data
Jul. 12, 2006 (JP) ............................ 2006-191246

(51) Int. Cl.
*G02F 1/1335* (2006.01)
*B29D 11/00* (2006.01)
*G02B 5/30* (2006.01)

(52) U.S. Cl. .................. 349/119; 349/96; 349/117; 349/118; 349/187

(58) Field of Classification Search .............. 349/12, 349/75, 96, 106, 117–119, 123, 187, 191; 264/1.34; 359/499
See application file for complete search history.

(56) References Cited

U.S. PATENT DOCUMENTS

| 4,388,453 A | 6/1983 | Finkelmann et al. |
| 5,211,877 A | 5/1993 | Andrejewski et al. |
| 5,344,916 A | 9/1994 | Harris et al. |
| 5,480,964 A | 1/1996 | Harris et al. |
| 5,560,864 A | 10/1996 | Goulding |
| 5,580,850 A | 12/1996 | Bigorra Llosas et al. |

(Continued)

FOREIGN PATENT DOCUMENTS

DE 4342280 A1 6/1995

(Continued)

*Primary Examiner*—Frank G Font
*Assistant Examiner*—Michael P Mooney
(74) *Attorney, Agent, or Firm*—Westerman, Hattori, Daniels & Adrian, LLP.

(57) ABSTRACT

A polarizing plate with optical compensation layers that performs a wide viewing angle compensation with respect to a liquid crystal cell, allows circularly polarized light to be obtained over a wide range of light wavelengths, contributes to the reduction in thickness, prevents thermal irregularity from occurring, and can effectively prevent light leakage from occurring in a black display. The polarizing plate includes a polarizer, a first optical compensation layer, and a second optical compensation layer that are stacked together in this order. The first optical compensation layer is formed of a liquid crystal compound and has a relationship of $nx>ny=nz$ and an in-plane retardation $Re_1$ of 100 to 170 nm. The second optical compensation layer has a relationship of $nx=ny>nz$ and a thickness direction retardation $Rth_2$ of 30 to 400 nm. The angle formed between the absorption axis of the polarizer and the slow axis of the first optical compensation layer is in the range of "plus" or "minus" 25 to 65 degrees.

13 Claims, 6 Drawing Sheets

U.S. PATENT DOCUMENTS

| | | | |
|---|---|---|---|
| 5,580,950 | A | 12/1996 | Harris et al. |
| 5,744,057 | A | 4/1998 | Meyer et al. |
| 5,750,641 | A | 5/1998 | Ezzell et al. |
| 5,780,629 | A | 7/1998 | Etzbach et al. |
| 5,833,880 | A | 11/1998 | Siemensmeyer et al. |
| 5,886,242 | A | 3/1999 | Etzbach et al. |
| 5,969,088 | A | 10/1999 | Ezzell et al. |
| 6,074,709 | A | 6/2000 | Ezzell et al. |
| 6,238,753 | B1 | 5/2001 | Ezzell et al. |
| 6,281,952 | B1 | 8/2001 | Okamoto et al. |
| 6,383,578 | B2 | 5/2002 | Ezzell et al. |
| 6,563,554 | B2 * | 5/2003 | Okamoto et al. ............. 349/12 |
| 6,593,982 | B2 | 7/2003 | Yoon et al. |
| 6,717,637 | B1 | 4/2004 | Yoon et al. |
| 6,773,766 | B2 | 8/2004 | Meyer et al. |
| 6,900,863 | B2 | 5/2005 | Okamoto et al. |
| 6,930,740 | B2 | 8/2005 | Yoon et al. |
| 6,964,814 | B2 | 11/2005 | Fujii et al. |
| 7,050,132 | B2 | 5/2006 | Okamoto et al. |
| 7,235,283 | B2 | 6/2007 | Adachi et al. |
| 2005/0074564 | A1 | 4/2005 | Yamaoka et al. |
| 2005/0096431 | A1 | 5/2005 | Fujii et al. |
| 2005/0174564 | A1 | 8/2005 | Fee |
| 2005/0243248 | A1 | 11/2005 | Yoon et al. |
| 2006/0119752 | A1 | 6/2006 | Okamoto et al. |
| 2007/0046864 | A1 * | 3/2007 | Maruyama et al. ............ 349/96 |

FOREIGN PATENT DOCUMENTS

| | | |
|---|---|---|
| DE | 19504224 A1 | 8/1995 |
| DE | 4408171 A1 | 9/1995 |
| DE | 19520660 A1 | 12/1996 |
| DE | 19520704 A1 | 12/1996 |
| EP | 66137 A1 | 5/1982 |
| EP | 0261712 A1 | 3/1988 |
| EP | 358208 A2 | 9/1989 |
| EP | 0362122 A1 | 4/1990 |
| EP | 0698052 B1 | 2/1996 |
| EP | 0747382 A1 | 12/1996 |
| EP | 0788526 B1 | 8/1997 |
| EP | 0900406 B1 | 3/1999 |
| EP | 1160591 A1 | 12/2001 |
| GB | 2280445 A | 2/1995 |
| JP | 61-1420 A | 1/1986 |
| JP | 1240517 A | 9/1989 |
| JP | 314882 A | 1/1991 |
| JP | 3122137 A | 5/1991 |
| JP | 8-300040 A | 11/1996 |
| JP | 8511812 T | 12/1996 |
| JP | 10508048 T | 8/1998 |
| JP | 11242226 A | 9/1999 |
| JP | 2000511296 T | 8/2000 |
| JP | 200149110 A | 2/2001 |
| JP | 2001209065 A | 8/2001 |
| JP | 2001343529 A | 12/2001 |
| JP | 2002533742 T | 10/2002 |
| JP | 2003287623 A | 10/2003 |
| WO | WO 9322397 A1 | 11/1993 |
| WO | 9424191 A1 | 10/1994 |
| WO | 9611967 A1 | 4/1996 |
| WO | 9744704 A1 | 11/1997 |
| WO | WO 0037585 A1 | 6/2000 |
| WO | WO 0137007 A1 | 5/2001 |

* cited by examiner (a)

(b)

(a)

(b)

POLARIZING PLATE WITH OPTICAL COMPENSATION LAYER, METHOD OF PRODUCING THE SAME, AND LIQUID CRYSTAL PANEL, LIQUID CRYSTAL DISPLAY, AND IMAGE DISPLAY INCLUDING THE SAME

CROSS-REFERENCE TO RELATED APPLICATION

The present patent application claims priority based on prior-filed Japanese Patent Application No. 2006-191246 (filing date: Jul. 12, 2006).

BACKGROUND OF THE INVENTION

1. Field of the Invention

The present invention relates generally to a polarizing plate with optical compensation layers, a method of producing the same, and a liquid crystal panel, a liquid crystal display, and an image display, each of which includes the same.

2. Description of the Related Art

A semitransparent-reflective liquid crystal display has been proposed as a vertical alignment (VA) mode liquid crystal display in addition to a transmission liquid crystal display and a reflective liquid crystal display (see, for example, JP11 (1999)-242226 A and JP 2001-209065 A). The semitransparent-reflective liquid crystal display allows displays to be visible by using outside light in bright places as in the reflective liquid crystal display and an internal light source such as a backlight in dark places. In other words, the semitransparent-reflective liquid crystal display employs a display system of combination of the reflective and transmission types. It switches the display mode into either a reflective mode or a transmission mode according to the brightness of the surrounding. Accordingly, the semitransparent-reflective liquid crystal display can provide a clear display even when the surrounding is dark, while reducing consumption power. Therefore, it is used suitably for display parts of mobile devices.

An example of such a semitransparent-reflective liquid crystal display is a liquid crystal display that includes an upper substrate, a lower substrate, a liquid crystal layer, and a reflective film that is allowed to function as a semitransparent-reflective plate. The liquid crystal layer is sandwiched between the upper substrate and the lower substrate. The reflective film is provided on the inner side of the lower substrate and is formed of a metal thin film such as aluminum that is provided with a window formed for light transmission. In this type of liquid crystal display, in the case of the reflective mode, outside light incident from the upper substrate side is transmitted through the liquid crystal layer, is then reflected by the reflective film disposed on the inner side of the lower substrate, is transmitted through the liquid crystal layer again, and is then emitted from the upper substrate side to contribute to the display. On the other hand, in the case of the transmission mode, light emitted from a backlight that has entered from the lower substrate side passes through the window of the reflective film to pass through the liquid crystal layer and is then emitted from the upper substrate side to contribute to the display. Accordingly, in the region where the reflective film is formed, the region where the window is formed serves as a transmissive display region and the other region serves as a reflective display region. However, in these VA mode liquid crystal displays, especially liquid crystal displays of a reflection type, a semitransparent type, and a semitransparent-reflective type, there is a problem in that light leakage is caused in a black display which reduces the contrast. Accordingly, there is a demand for the solution conventionally.

On the other hand, the liquid crystal display requires a polarizing plate. An elliptically polarizing plate including a retardation film stacked on a polarizing plate as an optical compensation layer is used increasingly. The elliptically polarizing plate is also referred to as a "polarizing plate with optical compensation layers". It is used for supplying polarized light to the liquid crystal display while providing wide viewing angle properties at the same time. The polarizing plate with optical compensation layers is required to have not only the wide viewing angle properties but also a function that allows circularly polarized light to be obtained over a wide range of light wavelengths and contrast to be improved by preventing the above-mentioned light leakage from occurring in a black display. Moreover, in order to improve the brightness and to reduce the weight and thickness of the liquid crystal display, it is also required to improve the brightness and to reduce the weight and thickness of the polarizing plate with optical compensation layers. In addition, the polarizing plate with optical compensation layers has a problem of "thermal irregularity", that is, optical functions become uneven due to heat. This problem occurs because the thickness thereof is too thick.

SUMMARY OF THE INVENTION

Therefore, it is an object of the present invention to provide a polarizing plate with optical compensation layers that compensates the viewing angle with respect to a liquid crystal cell, allows circularly polarized light to be obtained over a wide wavelength range, contributes to an improve in brightness and a reduction in thickness, prevents thermal irregularity from occurring, and can effectively prevent light leakage from occurring in a black display. Other embodiments of the present invention are a liquid crystal panel, a liquid crystal display, and an image display, each of which includes the polarizing plate of the present invention.

A polarizing plate with optical compensation layers of the present invention includes a polarizer, a first optical compensation layer, and a second optical compensation layer that are stacked together in this order. The first optical compensation layer is formed of a liquid crystal compound and has a relationship of nx>ny=nz and an in-plane retardation $Re_1$ in the range of 100 to 170 nm. The second optical compensation layer has a relationship of nx=ny>nz and a thickness-direction retardation $Rth_2$ in the range of 30 to 400 nm. The angle formed between an absorption axis of the polarizer and a slow axis of the first optical compensation layer is in the range of 25 to 65 degrees in the clockwise direction (−) or in the counterclockwise direction (+) with respect to the absorption axis of the polarizer.

The liquid crystal panel of the present invention includes a polarizing plate with optical compensation layers of the present invention and a liquid crystal cell. The second optical compensation layer is disposed on the side that is close to the liquid crystal cell, and the second optical compensation layer is disposed on the visible side of the liquid crystal cell.

The liquid crystal display of the present invention is a liquid crystal display including a liquid crystal panel of the present invention.

The image display of the present invention is an image display including a polarizing plate with optical compensation layers of the present invention.

A production method of the present invention is a method of producing a polarizing plate with optical compensation layers of the present invention. The production method includes producing the first optical compensation layer by applying a liquid crystal compound to a rubbing-treated surface of a long base film that has been subjected to a rubbing treatment to be treated to have alignment, and fixing the alignment. The rubbing treatment is carried out by the rubbing method (A) described below.

Rubbing Method (A)

In a rubbing treatment process where the surface of the long base film is rubbed with a rubbing roll, the long base film is supported and conveyed by a conveyer belt with a metal surface, while a plurality of backup rolls are provided to oppose the rubbing roll and to support the lower surface of the conveyer belt supporting the long base film, and the rubbing strength RS defined by Formula (1) below is set at 800 mm or higher.

$$RS = N \cdot M(1 + 2\pi r \cdot nr/v) \quad (1)$$

In Formula (1) above, N denotes the number of times of rubbing (the number of rubbing rolls) (dimensionless quantity), M indicates the indentation amount (mm) of a rubbing roll, a denotes the ratio of the circumference of a circle to its diameter, r indicates the radius (mm) of the rubbing roll, nr denotes the rotational speed (rpm) of the rubbing roll, and v indicates the rate of conveying the long base film (mm/sec).

As described above, a polarizer, a first optical compensation layer ($\lambda/4$ plate), and a second optical compensation layer (negative C plate) are stacked together in this order (that is, the first optical compensation layer is stacked adjacent to the polarizer), and the angle formed between the absorption axis of the polarizer and the slow axis of the first optical compensation layer is set in the predetermined range. Accordingly, in liquid crystal displays, for example, of a VA mode, wide viewing angle compensation providing excellent diagonal contrast is performed and circularly polarized light can be obtained over a wide wavelength range. Thus, the brightness is improved, and the light leakage in a black display can be improved considerably. Furthermore, in the polarizing plate with optical compensation layers of the present invention, a first optical compensation layer and a second optical compensation layer that have predetermined optical properties are used in combination, and the first optical compensation layer and the polarizer are stacked together so that a predetermined angle is formed between the slow axis of the first optical compensation layer and the absorption axis of the polarizer. Thus, it is possible to omit the $\lambda/2$ plate that is used in a conventional wide-viewing-angle elliptically polarizing plate. Preferably, the polarizing plate with optical compensation layers of the present invention does not contain a $\lambda/2$ plate. But it may contain a $\lambda/2$ plate. Moreover, the first optical compensation layer is formed of a liquid crystal compound. Therefore the total thickness can be reduced. Accordingly, the weight and thickness can be reduced, and thermal irregularity can be prevented from occurring.

DETAILED DESCRIPTION OF THE INVENTION

Figure 1:
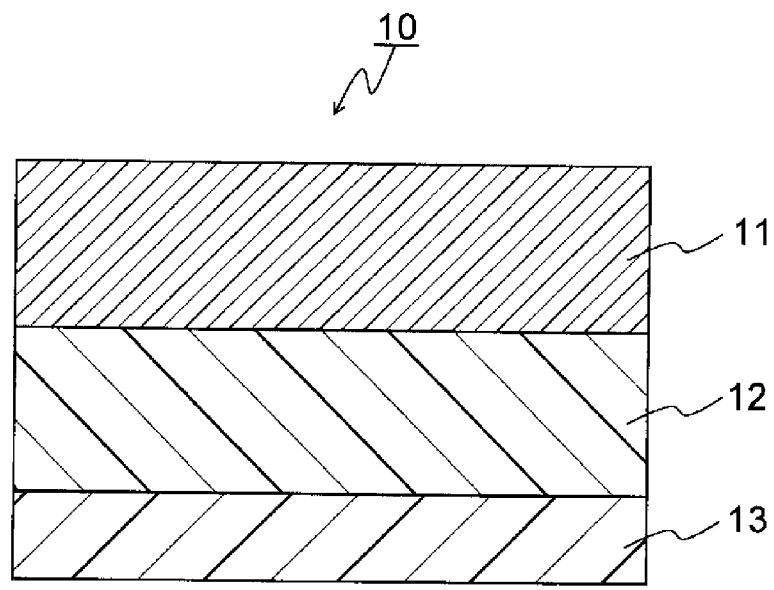
FIG. 1 is a schematic cross-sectional view of an example of the polarizing plate with optical compensation layers according to the present invention.

In the polarizing plate with optical compensation layers of the present invention, the thickness of the first optical compensation layer is, for example, in the range of 0.5 to 3 μm.

In the polarizing plate with optical compensation layers of the present invention, the second optical compensation layer can be configured so as to include a cholesterically aligned and solidified layer having a selective reflection wavelength range of 350 nm or shorter.

In the polarizing plate with optical compensation layers of the present invention, the thickness of the second optical compensation layer is, for example, in the range of 1 to 20 μm.

In the polarizing plate with optical compensation layers of the present invention, the second optical compensation layer has a relationship of nx=ny>nz and can be configured so as to include a layer formed of a film containing resin having an absolute value of photoelastic coefficient of $2 \times 10^{-11}$ m$^2$/N or lower and a cholesterically aligned and solidified layer having a selective reflection wavelength range of 350 nm or shorter.

In the polarizing plate with optical compensation layers of the present invention, the second optical compensation layer can be configured so as to be a layer formed of a non-liquid crystal polymer. In this case, the non-liquid crystal polymer is at least one polymer selected from the group consisting of polyamide, polyimide, polyester, polyetherketone, polyaryletherketone, polyamide imide, and polyesterimide.

In the liquid crystal panel of the present invention, the liquid crystal cell is preferably of a VA mode or an ECB mode.

DEFINITIONS OF TERMS AND SYMBOLS

Definitions of the terms and symbols used in the present invention are as follows:

(1) "nx" denotes a refractive index in the direction in which the highest in-plane refractive index is obtained (i.e. the slow axis direction), "ny" indicates a refractive index in an in-plane direction perpendicular to the slow axis (i.e. the fast axis direction), and "nz" denotes a refractive index in the thickness direction. Furthermore, for example, "nx=ny" or "ny=nz" embraces not only the case where nx and ny, or ny and nz are exactly equal to each other but also the case where nx and ny, or ny and nz are substantially equal to each other. In the present invention, the phrase "substantially equal" denotes that the following case is also embraced, i.e. the case where nx and ny, or ny and nz are different from each other within the range in which overall polarization properties of the polarizing plate with optical compensation layers are not affected practically.

(2) The term "in-plane retardation Re" is an in-plane retardation of a film (layer) that is measured using light with a wavelength of 590 nm at 23° C., for example. Re can be determined by the formula, Re=(nx−ny)×d, where nx and ny denote the refractive indices in the slow axis direction and the fast axis direction of the film (layer) at a wavelength of 590 nm, and d (nm) indicates the thickness of the film (layer), for example.

(3) The thickness direction retardation Rth denotes the thickness direction retardation measured using light with a wavelength of 590 nm at 23° C., for example. Rth can be determined by the formula, Rth=(nx−nz)×d, where nx and nz denote the refractive indices in the slow axis direction and the thickness direction of the film (layer) at a wavelength of 590 nm, and d (nm) indicates the thickness of the film (layer), for example.

(4) The subscript "1" attached to terms and symbols used in the present invention denotes the first optical compensation layer. The subscript "2" indicates the second optical compensation layer. On the other hand, the subscript "C" denotes the cholesterically aligned and solidified layer.

(5) The term "λ/4 plate" refers to one having a function of converting linearly polarized light with a certain wavelength to circularly polarized light (or vice versa). In the λ/4 plate, the in-plane retardation of the film (layer) is approximately one fourth with respect to a certain light wavelength (generally, in the visible light region).

(6) The term "λ/2 plate" refers to one having a function of converting linearly polarized light of a certain oscillation direction to linearly polarized light of an oscillation direction orthogonal to that of the former linearly polarized light, or right-handed circularly polarized light to left-handed circularly polarized light (or vice versa). In the λ/2 plate, the in-plane retardation of the film (layer) is approximately half with respect to a light wavelength (generally, in the visible light region).

(7) The term "cholesterically aligned and solidified layer" denotes a layer in which the constituent molecules of the layer have a helical structure, the helical axis thereof is aligned substantially perpendicular to the plane direction, and the alignment state is fixed. Accordingly, the term "cholesterically aligned and solidified layer" embraces not only the case where the liquid crystal compound exhibits a cholesteric liquid crystalline phase but also the case where the non-liquid crystal compound has a similar structure to that of the cholesteric liquid crystalline phase. For example, the "cholesterically aligned and solidified layer" can be formed as follows. That is, the liquid crystal compound is provided with a twist using a chiral dopant in the state where the liquid crystal compound exhibits a liquid crystalline phase to be aligned in a cholesteric structure (helical structure), which is then subjected to a polymerization treatment or crosslinking treatment, so that the alignment (cholesteric structure) of the liquid crystal compound is fixed.

(8) The phrase "a selective reflection wavelength range of 350 nm or shorter" denotes that the center wavelength λ of the selective reflection wavelength range is 350 nm or shorter. For example, when the cholesterically aligned and solidified layer is formed using a liquid crystal monomer, the center wavelength λ of the selective reflection wavelength range is represented by the following formula:

$$\lambda = n \times P$$

where n denotes an average refractive index of the liquid crystal monomer, and P indicates the helical pitch (nm) of the cholesterically aligned and solidified layer. The average refractive index n is expressed as $(n_o + n_e)/2$ and is generally in the range of 1.45 to 1.65. In this case, $n_o$ denotes the ordinary light refractive index of the liquid crystal monomer, and $n_e$ indicates the extraordinary light refractive index of the liquid crystal monomer.

(9) The "chiral dopant" is a compound having a function of aligning a liquid crystal compound (for example, a nematic liquid crystal) so that it has a cholesteric structure.

(10) The term "twisting power" denotes an ability of a chiral dopant to give a twist to a liquid crystal compound to align it into a cholesteric structure (helical structure). Generally, the twisting power is expressed by the following formula:

$$\text{Twisting power} = 1/(P \times W)$$

where P denotes the helical pitch (nm) of the cholesterically aligned and solidified layer as described above, and W indicates the weight ratio of the chiral dopant. The weight ratio W can be expressed as: $W = [X/(X+Y)] \times 100$, where X denotes the weight of the chiral dopant, and Y indicates the weight of the liquid crystal compound.

(11) The term "long film" or "long base film" denotes a film (or a base film) which has a certain level of length to be able to be conveyed by a conveyer belt. In the present invention, the term "long film" or "long base film" denotes, for example, a film so-called "long film" or "long base film" in the technical field of polarizing plate with optical compensation layers, polalyzers, optical compensation films, and so on.

A. Polarizing Plate with Optical Compensation Layers

A-1. Overall Configuration of Polarizing Plate with Optical Compensation Layers

Figure 2:
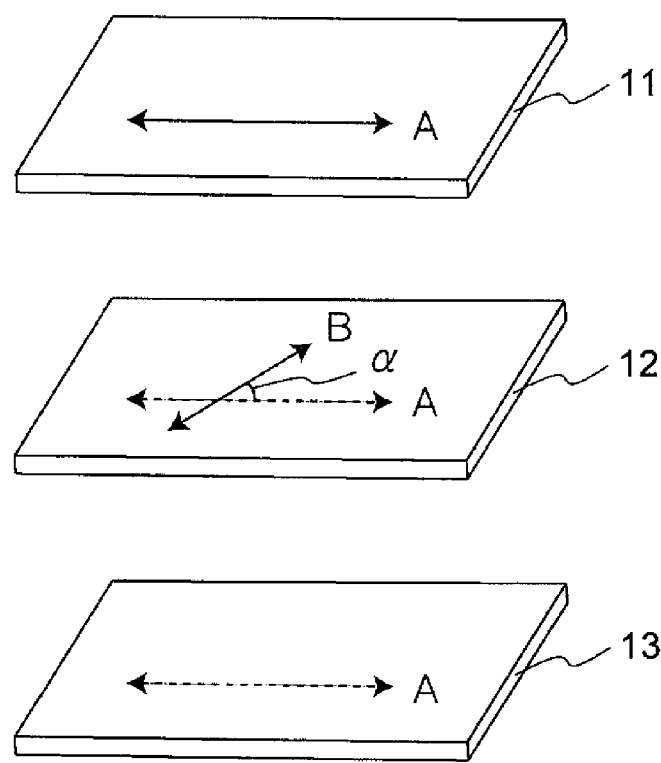
FIG. 2 is an exploded perspective view of an example of the polarizing plate with optical compensation layers according to the present invention.

FIG. 1 is a schematic cross-sectional view showing an example of the polarizing plate with optical compensation layers according to the present invention. FIG. 2 is an exploded perspective view for explaining optical axes of the respective layers of the polarizing plate with optical compensation layers shown in FIG. 1. As shown in FIG. 1, this polarizing plate with optical compensation layers 10 is configured with a polarizer 11, a first optical compensation layer 12, and a second optical compensation layer 13 that are stacked together in this order. The respective layers of the polarizing plate with optical compensation layers are stacked together through any suitable pressure-sensitive adhesive layer or any suitable adhesive layer (not shown). A suitable protective film (not shown) may be stacked on the side of the polarizer 11 where the optical compensation layers are not formed. Furthermore, a protective film (not shown) may be provided between the polarizer 11 and the first optical compensation layer 12 as required.

The first optical compensation layer 12 is formed of a liquid crystal compound and has a relationship of nx>ny=nz and an in-plane retardation $Re_1$ in the range of 100 to 170 nm. Preferably, the first optical compensation layer has a thickness direction retardation $Rth_1$, for example, in the range of 100 to 170 μm. The second optical compensation layer 13 has a relationship of nx=ny>nz and a thickness direction retardation $Rth_2$ in the range of 30 to 400 nm. In the second optical compensation layer, the in-plane retardation $Re_2$ is, for example, in the range of 0 to 20 nm, preferably in the range of 0 to 10 nm, and more preferably in the range of 0 to 5 nm. The first optical compensation layer and the second optical compensation layer are described in detail in sections A-2 and A-3 later, respectively.

In FIG. 2, the first optical compensation layer 12 is stacked so that the slow axis B thereof defines a predetermined angle α with respect to an absorption axis A of the polarizer 11. With respect to the angle α, that of counterclockwise with respect to the absorption axis A of the polarizer 11 is "plus", and that of clockwise is "minus". In FIG. 2, since the angle α is that of counterclockwise with respect to the absorption axis A of the polarizer 11, it is "plus". With respect to the absorption axis A of the polarizer 11, the angle α is in the range of +25 to +65 degrees or −25 to −65 degrees, preferably in the range of +30 to +60 degrees or −30 to −60 degrees, and more preferably in the range of +35 to +55 degrees or −35 to −55 degrees. Furthermore, the second optical compensation layer 13 is stacked at any suitable angle with respect to the absorption axis A of the polarizer 11. When the first optical compensation layer having specific optical properties in such a specific positional relationship is stacked, light leakage caused in a black display of, for example, a VA mode liquid crystal display can be prevented considerably.

The total thickness of the polarizing plate with optical compensation layers of the present invention is, for example, in the range of 100 to 250 μm, preferably in the range of 110 to 240 μm, and more preferably in the range of 120 to 230 μm. According to the present invention, excellent optical compensation can be achieved with the first optical compensation layer (λ/4 plate described later) and the second optical compensation layer (negative C plate described later) alone. As a result, the polarizing plate with optical compensation layers of the present invention can have, for example, a three-layer (the polarizer, the first optical compensation layer, and the second optical compensation layer) structure at the minimum. Thus, the number of layers thereof can be reduced by one layer with compared to that of a conventional polarizing plate with optical compensation layers that requires a λ/2 plate. Furthermore, in the polarizing plate with optical compensation layers of the present invention, since the first optical compensation layer is formed of a liquid crystal compound, a large in-plane retardation $Re_1$ can be obtained even when the thickness thereof is reduced. As a result, the polarizing plate with optical compensation layers of the present invention can be reduced in total thickness. Moreover, when the second optical compensation layer is formed, for example, of a composition containing a liquid crystal monomer and a chiral dopant, or a non-liquid crystal polymer, a very large thickness direction retardation $Rth_2$ can be obtained even when the layer is reduced in thickness. As a result, the second optical compensation layer can be very thin. For example, while a conventional negative C plate formed by biaxial stretching has a thickness of at least 60 μm, the second optical compensation layer used in the present invention can be reduced in thickness to about 1 μm. The suitable selection of the material for forming the second optical compensation layer as described above also allows the polarizing plate with optical compensation layers of the present invention to further be reduced in total thickness accordingly. Thus, effects such as reductions in weight and thickness and prevention of thermal irregularity can be obtained. The polarizing plate with optical compensation layers of the present invention can contribute considerably to reductions in weight and thickness and an improvement in display properties of an image display.

A-2. First Optical Compensation Layer

The first optical compensation layer 12 can function as a λ/4 plate. When the first optical compensation layer functions as a λ/4 plate, the function of circular polarization can be exhibited in a wide wavelength range. The in-plane retardation $Re_1$ is in the range of 100 to 170 nm, preferably in the range of 110 to 165 nm, and further preferably in the range of 120 to 160 nm. Moreover, as described above, the first optical compensation layer 12 has a refractive index distribution of nx>ny=nz.

The thickness of the first optical compensation layer is, for example, in the range of 0.5 to 3 μm, preferably in the range of 0.7 to 2.5 μm, and more preferably in the range of 1 to 2 μm.

As described above, the material for forming the first optical compensation layer is a liquid crystal compound. The liquid crystal compound is not particularly limited but is preferably a liquid crystal compound whose liquid crystalline phase is a nematic phase (nematic liquid crystal), for example. Examples of the liquid crystal compound include a liquid crystal monomer and a liquid crystal polymer. The mechanism of expressing the liquid crystallinity of the liquid crystal compound can be lyotropic or thermotropic. The alignment state of the liquid crystal is not particularly limited but is preferably homogeneous alignment. The liquid crystal monomer and liquid crystal polymer can be used individually or in combination.

Preferably, the liquid crystal monomer is, for example, at least one of a polymerizable monomer and a crosslinkable monomer. This is because the alignment state of the liquid crystal monomer can be fixed through polymerization or crosslinking of the liquid crystal monomer as described later. That is, after liquid crystal monomers are aligned, for example, when the liquid crystal monomers are polymerized or crosslinked to one another, a three-dimensional network in which the liquid crystal monomers are linked to one another is formed, which is non-liquid crystalline. Accordingly, the resultant first optical compensation layer does not undergo, for example, phase change caused by temperature change that are peculiar to the liquid crystal compound, i.e. transition to a liquid crystalline phase, glassy phase, or crystalline phase. As a result, the first optical compensation layer is not affected by the temperature change and therefore is very stable.

Any suitable liquid crystal monomer can be employed as the above-mentioned liquid crystal monomer. Examples thereof include polymerizable mesogenic compounds described, for example, in JP 2002-533742 A (WO00/37585), EP 358208 (U.S. Pat. No. 5,211,877), EP 66137 (U.S. Pat. No. 4,388,453), WO 93/22397, EP 0261712, DE 19504224, DE 4408171, and GB 2280445. Specific examples of such polymerizable mesogenic compounds include LC242 (trade name) manufactured by BASF AG, E7 (trade name) manufactured by Merck Ltd., and LC-Sillicon-CC3767 (trade name) manufactured by Wacker-Chemie GmbH).

For example, a nematic liquid crystal monomer is preferred as the above-mentioned liquid crystal monomer. Specific examples thereof include liquid crystal monomers described in paragraphs 0035 to 0046 in JP 2003-287623 A. Preferable liquid crystal monomers are those represented by Chemical Formulas (1) to (16) described below. One of them can be used individually, or two or more of them can be used in combination.

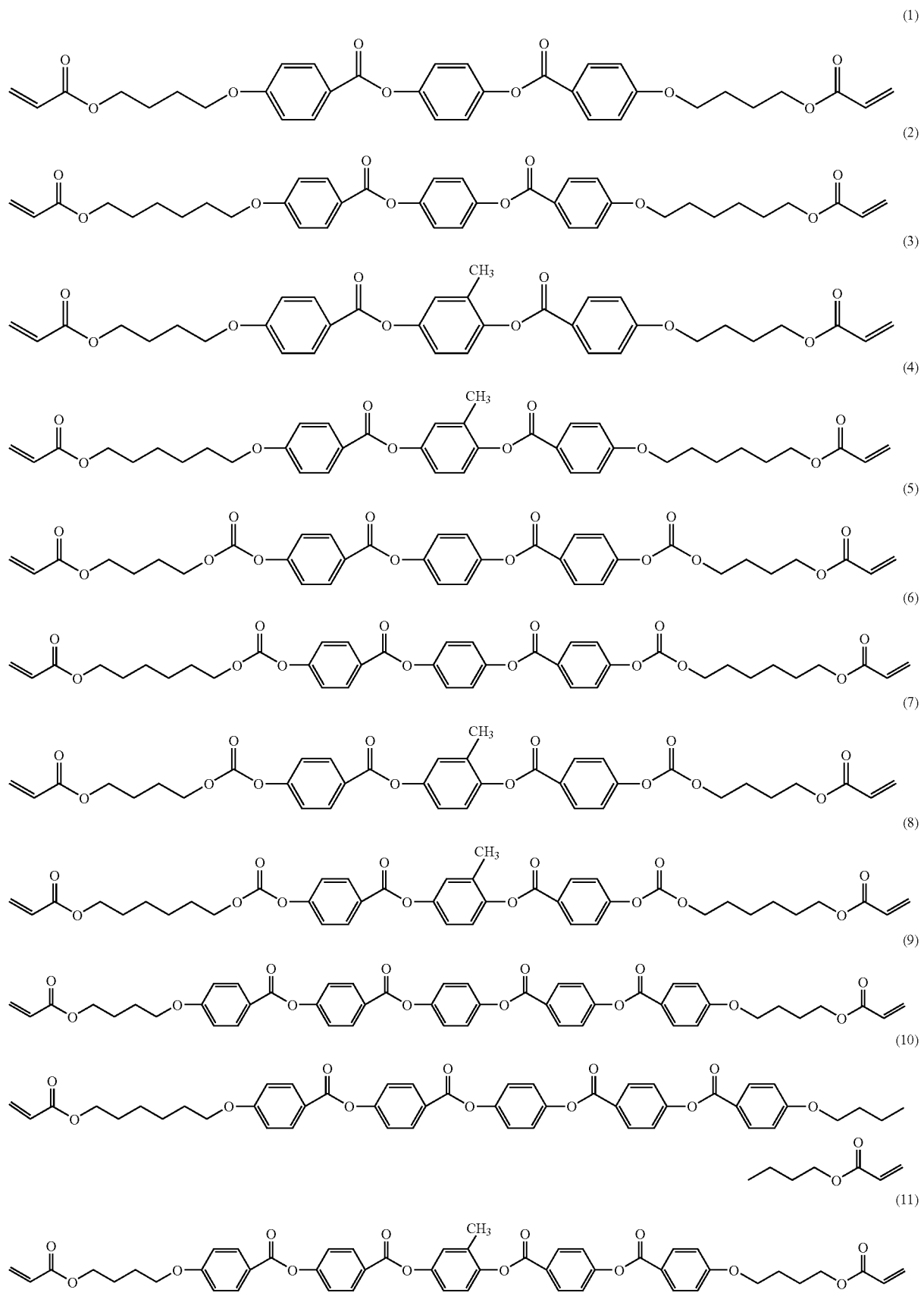

-continued

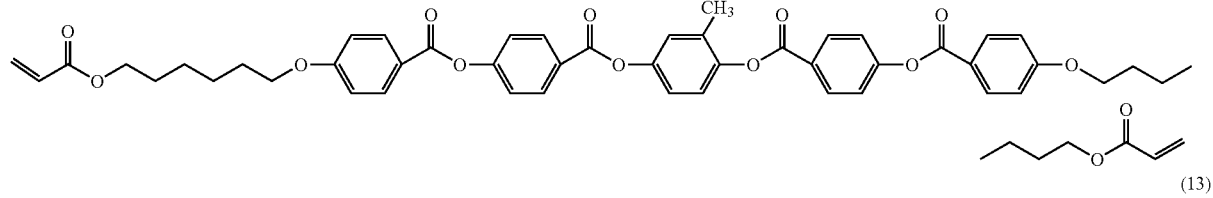

(12)

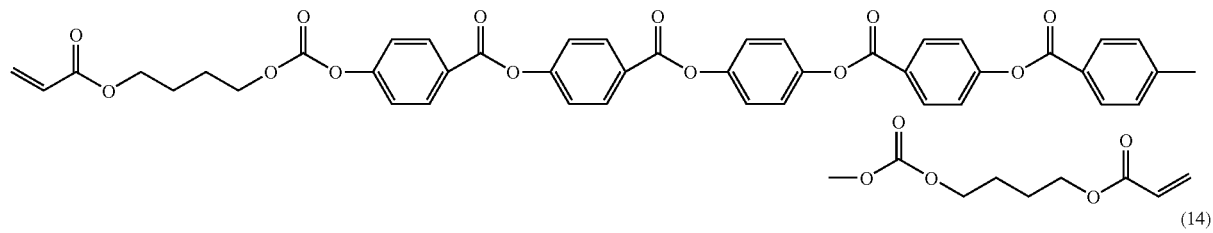

(13)

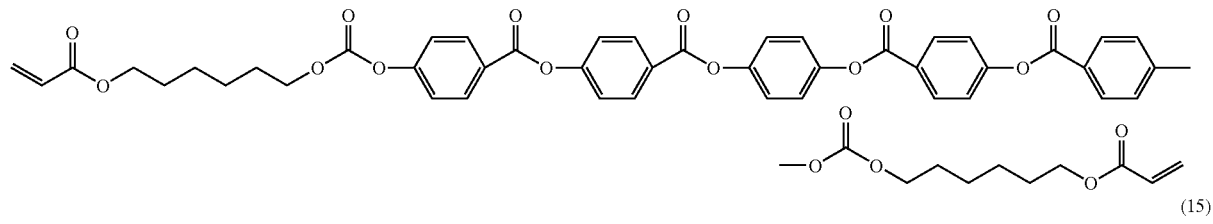

(14)

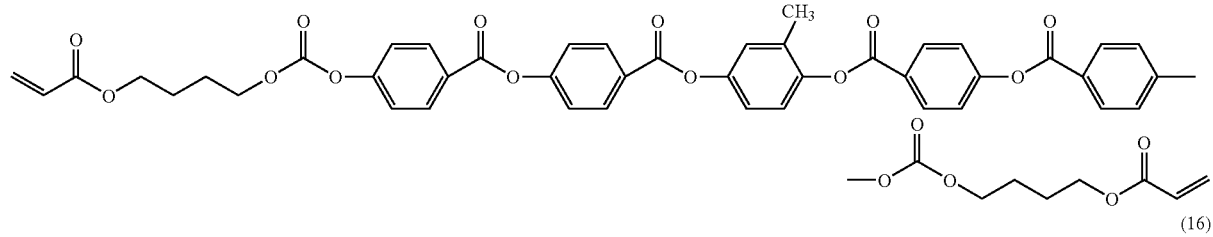

(15)

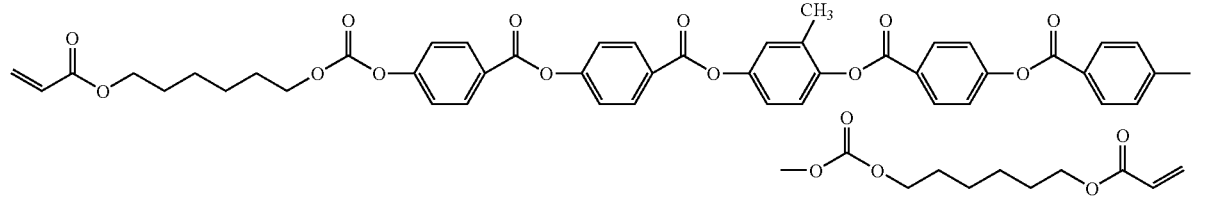

(16)

The temperature range in which the liquid crystal monomer exhibits liquid crystallinity depends on the type thereof. It is, for example, in the range of 40 to 120° C., preferably in the range of 50 to 100° C., and more preferably in the range of 60 to 90° C.

Next, the first optical compensation layer can be formed, for example, by applying the liquid crystal monomer to the surface of a base film whose surface has been subjected to an aligning treatment, aligning the liquid crystal monomer, and polymerizing or crosslinking it to fix the alignment state.

The base film is not particularly limited. Examples thereof include films formed of triacetyl cellulose (TAC), polyolefin such as polyethylene, polypropylene, or poly(4-methyl pentene-1), polyimide, polyimide amide, polyetherimide, polyamide, polyether ether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, acrylic resin, polyvinyl alcohol, polypropylene, cellulose plastics, epoxy resin, and phenolic resin. Furthermore, it is also possible to use as a base film a laminate including any one of the above-mentioned films and a birefringent stretched film that is stacked as an alignment film and that is obtained, for example, by subjecting a film to a stretching treatment such as uniaxial stretching. The form of the base film is preferably a form of a long film. The long film has a certain level of length to be able to be conveyed by a conveyer belt. The length of the long film is not particularly limited.

The aligning treatment for the base film is not particularly limited. Examples thereof include a mechanical aligning treatment, a physical aligning treatment, and a chemical aligning treatment. Examples of the mechanical aligning treatment include a rubbing treatment and a stretching treatment. Examples of the physical aligning treatment include a magnetic field aligning treatment and an electric field aligning treatment. Examples of the chemical aligning treatment include an oblique deposition process and a photo-aligning treatment. Among those, the rubbing treatment is preferred.

As described above, since in the polarizing plate with optical compensation layers of the present invention, the angle formed between the direction of the slow axis of the first optical compensation layer and the direction of the absorption axis of the polarizer is preferably in the range of +25 to +65 degrees or −25 to −65 degrees, the alignment direction to be employed in the aforementioned aligning treatment is preferably one that satisfies this condition. Generally, the polarizer is produced by stretching a long polymer film dyed with a dichroic material. Accordingly, the resultant polarizer may also be obtained in the form of a long film. The absorption axis of the long film forming the polarizer is in the stretching direction, i.e. in the longitudinal direction of the long film. In the production of the polarizing plate with optical compensation layers of the present invention, from the viewpoint of production efficiency, it is preferable that a long first optical compensation layer be stacked on a polarizer formed of a long film, which is then cut into a suitable size. In this case, when the base film is a long film, the alignment direction employed in the above-mentioned aligning treatment is preferably an oblique direction that allows the aforementioned angle to be obtained with respect to the longitudinal direction thereof. As described later, however, when the first optical compensation layer is transferred to the polarizer, the slow axis of the first optical compensation layer is inversed after transfer. Accordingly, it is preferable that the alignment direction be determined with consideration given to this.

A preferable method of subjecting the long base film to an aligning treatment is one in which while the base film is conveyed with rolls, a rubbing treatment is carried out continuously with a rubbing roll. The alignment direction can be adjusted by directing the rubbing roll to a predetermined direction with respect to the direction in which the base film is conveyed.

When a base film is wound around a roll, which is then conveyed to be subjected to a rubbing treatment, blocking (a phenomenon that bases adhere to one another without having an optical interface) may be caused in the base film wound around the roll before it is subjected to the rubbing treatment. In such a base film, there is a problem in that since the surface state of the portion where blocking has occurred is changed, even when the rubbing treatment is carried out, the portion where blocking has occurred and the portion other than that may be different in alignment properties from each other and thereby no uniform alignment state (uniform optical properties) may be obtained due to the occurrence of a domain in an applied liquid crystal compound. Therefore, even when using a base film that may be suffered from blocking, it is preferable that the rubbing treatment be carried out by the rubbing method (A) as described above to form an optical compensation layer having uniform optical properties at low cost. When this rubbing treatment is carried out, a first optical compensation layer having uniform optical properties can be formed thinly at low cost.

That is, the rubbing method (A) is a method in which in a rubbing treatment process where the surface of a long base film is rubbed with a rubbing roll, the long base film is supported and conveyed by a conveyer belt with a metal surface, while a plurality of backup rolls are provided to support the lower surface of the conveyer belt supporting the long base film and to oppose the rubbing roll, and the rubbing strength RS defined by Formula (1) below is set at 800 mm or higher. The rubbing strength RS is preferably at least 850 mm, more preferably at least 1000 mm, further preferably at least 2200 mm, and most preferably at least 2600 mm. The upper limit of the rubbing strength RS is not particularly limited, but is, for example, 21000 mm or less, preferably 18000 mm or less, more preferably 16000 mm or less, and further preferably 15000 mm or less. When the rubbing strength RS is 21000 mm or less, problems such as a breakage of the long base film tend not to be caused. From this point of view, the upper limit of the rubbing strength RS is further preferably 10000 mm or less and particularly preferably 5000 mm or less.

$$RS = N \cdot M(1 + 2\pi r \cdot nr/v) \tag{1}$$

In Formula (1) above, N denotes the number of times of rubbing (the number of rubbing rolls) (dimensionless quantity), M indicates the indentation amount (mm) of a rubbing roll, it denotes the ratio of the circumference of a circle to its diameter, r indicates the radius (mm) of the rubbing roll, nr denotes the rotational speed (rpm) of the rubbing roll, and v indicates the rate of conveying the long base film (mm/sec).

The aforementioned method achieves low cost because (1) even if the indentation amount of the rubbing roll is allowed to increase, the rubbing treatment can be carried out in a stable state, with a plurality of backup rolls being provided for supporting the lower surface of the conveyer belt that supports and conveys the long base film in carrying out the rubbing treatment, (2) even when blocking has occurred in the long base film, uniform alignment properties (uniform optical properties) can be obtained by setting the value of the parameter referred to as the "rubbing strength" to at least a predetermined value, and (3) the rubbing treatment can be carried out continuously with respect to the long base film by a roll to roll method. In the above-mentioned method, the phrase "the indentation amount of the rubbing roll" denotes an indentation amount (the amount of change in position) of the rubbing roll into the long base film from an original point (point zero), with the position where the rubbing roll comes into contact with the long base film surface first being taken as the original point, in the case where the position of the rubbing roll is changed with respect to the long base film surface. The rubbing roll is preferably one with raised cloth wound therearound. In the case of a rubbing roll with raised cloth wound therearound, the "radius of the rubbing roll" denotes the radius including the raised cloth. The original point of the "indentation amount of the rubbing roll" is referred to the position where the raised cloth comes into contact with the long base film surface first.

In the rubbing method, the flatness of the conveyer belt supported with backup rolls tends to be improved by providing a plurality of bar-shaped backup rolls in parallel with each other, with the backup rolls supporting the lower surface of the conveyer belt that conveys and supports the long base film when the rubbing treatment is carried out. In this case, when the center distance of adjacent backup rolls is set to shorter than 50 mm, it is inevitably necessary to reduce the outer diameters of the backup rolls. In this case, if the rate of conveying the long base film is constant, the backup rolls rotate at a higher speed during the rubbing treatment as compared to the case where the backup rolls have larger outer diameters. The heat generated thereby may cause problems in that, for example, the long base film supported by the conveyer belt may be deformed. On the other hand, when the center distance of adjacent backup rolls is set to longer than 90 mm, there is a problem in that the flatness of the conveyer belt decreases and thereby irregularities in alignment tend to occur to cause defective appearance. Accordingly, in order to avoid such problems, the center distance of adjacent backup rolls is set preferably in the range of 50 mm to 90 mm and more preferably in the range of 60 mm to 80 mm. This preferable configuration allows the long base film to be provided with further uniform alignment properties and in turn makes it possible to form an optical compensation layer with further uniform optical properties.

When the outer diameter (diameter) of the backup rolls is set to smaller than 30 mm, provided that the rate of conveying the long base film is constant, the backup rolls rotate at a higher speed during the rubbing treatment as compared to the case where the backup rolls have larger outer diameters. The heat generated thereby may cause problems in that, for example, the long base film supported by the conveyer belt may be deformed. On the other hand, when the outer diameter of the backup rolls is set to larger than 80 mm, there is a problem in that the flatness of the conveyer belt decreases, thereby irregularities in alignment tend to occur to cause defective appearance. Therefore, the outer diameter of the backup rolls is set preferably in the range of 30 mm to 80 mm (more preferably 40 mm to 70 mm).

The rubbing method is particularly effective when the base film is a TAC film. Preferably, the TAC film is one that has been saponified. Saponification of the TAC film can prevents the phenomenon of destructing the optical compensation layer (i.e. so-called "blocking") from occurring when a base film (TAC film) with an optical compensation layer formed thereon is wound up in the roll form.

Furthermore, the raised cloth to be used is preferably any one of rayon, cotton, nylon, and a mixture thereof.

In order to provide the conveyer belt with flexibility while preventing it from becoming slack easily, the thickness of the conveyer belt is preferably in the range of 0.5 to 2.0 mm and more preferably in the range of 0.7 to 1.5 mm.

An example of the rubbing method is described below with reference to the drawings.

Figure 7:
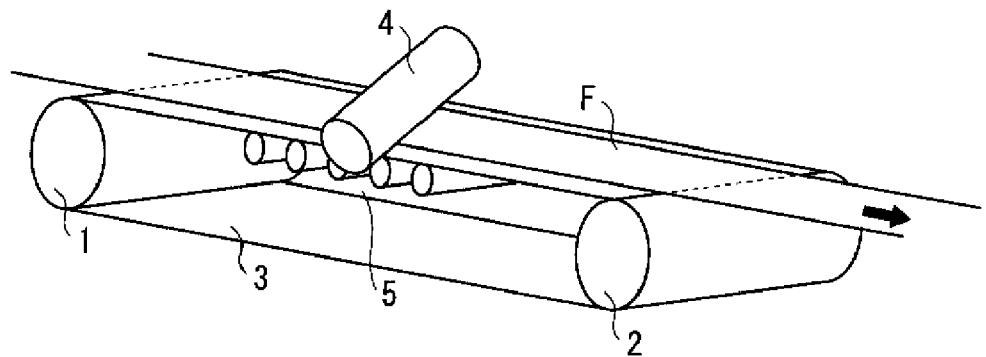
FIG. 7 is a perspective view showing an example of a method of producing a polarizing plate with optical compensation layers according to the present invention.

FIG. 7 is a perspective view showing the schematic configuration of a rubbing processor for carrying out the rubbing method (A). As shown in FIG. 7, the rubbing processor includes: drive rolls 1 and 2; an endless conveyer belt 3 that is installed between the drive rolls 1 and 2 and that supports and conveys a long base film F; a rubbing roll 4 disposed above the conveyer belt 3 in a vertically movable manner; and a plurality (five in this example) of bar-shaped backup rolls 5 that are disposed to support the lower surface of the conveyer belt 3 supporting the long base film F and to oppose the rubbing roll 4. For example, a suitable static elimination equipment and dust removal equipment can be disposed before or after the rubbing processor as required.

In the conveyer belt 3, the surface located on the side supporting the long base film F is a mirror-finished metal surface (the whole conveyer belt 3 can be made of metal). Various metal materials such as copper and steel can be used for such metal. However, from the viewpoints of strength, hardness, and durability, the use of stainless steel is preferable. In order to obtain a close contact with the long base film F, the level of mirror finish is preferably 0.02 μm or less and more preferably 0.01 μm or less in terms of arithmetic average surface roughness Ra (JIS B 0601-1994 version). Furthermore, in order to prevent the long base film F from slacking, it is necessary to prevent the conveyer belt 3 supporting it from slacking. When consideration is given to the necessity of not only preventing the conveyer belt 3 from slacking but also providing it with a certain level of flexibility to install it between the drive rolls 1 and 2, the thickness of the conveyer belt 3 is preferably in the range of 0.5 to 2.0 mm and more preferably in the range of 0.7 to 1.5 mm. Moreover, with consideration given to the prevention of slacking of the conveyer belt 3 and the tensile strength of the conveyer belt 3, the tension to be applied to the conveyer belt 3 is preferably in the range of 0.5 to 20 kgf/mm$^2$ and more preferably in the range of 2 to 15 kgf/mm$^2$.

The rubbing roll 4 includes raised cloth wound around the outer peripheral surface. For example, the material and shape of the raised cloth can be selected suitably according to the material of the long base film F to be subjected to the rubbing treatment. Generally, rayon, cotton, nylon, or a mixture thereof can be used for the raised cloth. The rotation axis of the rubbing roll 4 according to this example is configured so that it can be tilted (with, for example, a tilt angle of 0 to 45 degrees) from the direction perpendicular to the direction in which the long base film F is conveyed (i.e. the direction indicated with an arrow in FIG. 7), that is, so that it can be set at any axial angle with respect to the long side (longitudinal direction) of the long base film F. The direction in which the rubbing roll 4 rotates can be selected suitably according to the conditions for the rubbing treatment.

As described above, a plurality of backup rolls 5 are disposed so as to support the lower surface of the conveyer belt 3 supporting the long base film F and to oppose the rubbing role 4. Since a plurality of backup rolls 5 are provided, even if the rubbing roll 4 indents the long base film F, with the rotation axis thereof being tilted, or even if the indentation amount of the rubbing roll 4 is increased, the rubbing treatment can be carried out stably.

When the base film F is subjected to the rubbing treatment using the rubbing processor, the long base film F wound around a predetermined roll (not shown) is fed onto the conveyer belt 3 through a plurality of conveyer rolls (not shown). With the drive rolls 1 and 2 being driven and rotated, the upper part of the conveyer belt 3 moves in the direction shown with the arrow in FIG. 7 and thereby the long base film F is also conveyed together with the conveyer belt 3 and it is subjected to the rubbing treatment with the rubbing roll 4.

In the rubbing treatment process of the present invention, the rubbing strength RS defined by Formula (1) described below is set at 800 mm or higher.

$$RS=N \cdot M(1+2\pi r \cdot nr/v) \qquad (1)$$

Figure 8:
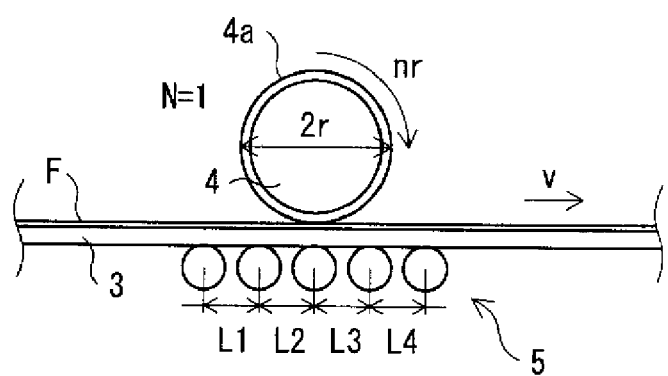
FIGS. 8(a) and 8(b) each are a partial front view of FIG. 7.
Figure 8:
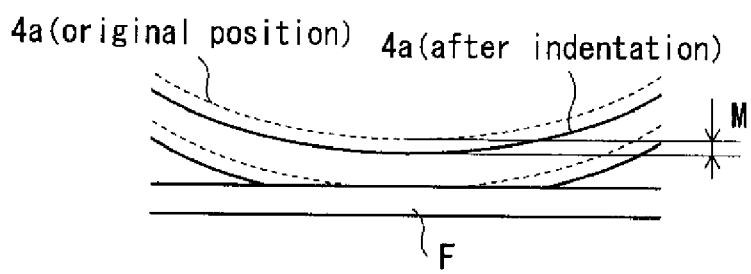

FIGS. 8(a) and 8(b) each are a partial front view illustrating the rubbing processor shown in FIG. 7. FIG. 8(a) is a front view showing the vicinity of the rubbing roll 4, and FIG. 8(b) is an enlarged front view showing the vicinity of the place where the rubbing roll 4 and the base film F surface are in contact with each other. As described earlier, in Formula (1) above, N denotes the number of times of rubbing (corresponding to the number of rubbing rolls 4, i.e. 1 in this example) (dimensionless quantity), M indicates the indentation amount (mm) of the rubbing roll 4, n denotes the ratio of the circumference of a circle to its diameter, r indicates the radius (mm) of the rubbing roll 4 (including the raised cloth 4a), nr denotes the rotational speed (rpm) of the rubbing roll, and v indicates the rate of conveying the base film F (mm/sec). As shown in FIG. 8(b), the indentation amount M of the rubbing roll denotes an amount of indenting the rubbing roll 4 into the long base film F from the original point (an amount of indenting the long base film F into a position indicated with a sold line in FIG. 8(b)), with the position where the outer edge of the raised cloth 4a wound around the rubbing roll 4 comes into contact with the long base film F surface first (the position indicated with a broken line in FIG. 8(b)) being taken as the original point (point zero), in the case where the position of the rubbing roll 4 is changed with respect to the long base film F surface.

As described before, when the rubbing strength RS is set at 800 mm or higher, uniform alignment properties can be provided even if blocking has occurred in the long base film F, and it in turn is possible to produce optical compensation layers with uniform optical properties. The material of the base film F to be subjected to the rubbing treatment according to this example is not particularly limited as long as it is provided with a function that can align the liquid crystal compound applied to the surface as described later by subjecting the surface thereof or the alignment film formed on the surface to the rubbing treatment. The aforementioned base film can be used for the base film F. As described above, this rubbing treatment is effective, for example, for a TAC film that tends to suffer from blocking, and a preferable TAG film is one saponified.

The rubbing treatment conditions (respective parameters) other than the rubbing strength RS set at 800 mm or higher can be selected arbitrarily. The rate v of conveying the base film F is, for example, in the range of 1 to 50 m/min and preferably in the range of 1 to 10 m/min. The rotational speed nr of the rubbing roll 4 is, for example, in the range of 1 to 3000 rpm and preferably in the range of 500 to 2000 rpm. The indentation amount M of the rubbing roll 4 is, for example, in the range f 100 to 2000 μm and preferably in the range of 100 to 1000 μm.

In this example, with respect to a plurality of bar-shaped backup rolls 5 disposed substantially in parallel with one another, the center distances (L1 to L4 shown in FIG. 8) of adjacent respective backup rolls 5 each are set in the range of 50 mm to 90 mm (more preferably in the range of 60 mm to 80 mm) as a preferable configuration. With this configuration, the flatness of the conveyer belt 3 that is supported by the backup rolls 5 tends to be improved. Furthermore, since the center distances L1 to L4 each are set at 50 mm or longer (this inevitably increase the outer diameter of the backup rolls to some extent), the backup rolls 5 do not rotate at high speed during the rubbing treatment. Accordingly, the heat generated thereby tends not to cause problems such as deformation of the long base film F supported by the conveyer belt 3. Furthermore, since the center distances L1 to L4 each are set at 90 mm or shorter, the flatness of the conveyer belt 3 does not deteriorate and the long base film F can be provided with uniform alignment properties. The outer diameter of each backup roll 5 is set preferably in the range of 30 mm to 80 mm (more preferably 40 mm to 70 mm). When the outer diameter of the backup roll 5 is set at 30 mm or larger, the backup rolls 5 do not rotate at high speed during the rubbing treatment. Accordingly, the heat generated thereby tends not to cause problems such as deformation of the long base film F supported by the conveyer belt 3. When the outer diameter of each backup roll is set at 80 mm or smaller, the flatness of the conveyer belt 3 does not deteriorate, and the long base film F can be provided with uniform alignment properties. In this example, the description was made using an example in which the backup rolls 5 are bar-shaped rolls. However, the present invention is not limited to this. A plate provided with a plurality of spherical bodies (bearing plate) also can be used as the backup rolls.

Next, a liquid crystal monomer is applied to the surface, which has been subjected to the aligning treatment, of the base film thus obtained. For the application, a coating solution is prepared in which liquid crystal monomer and other components are dissolved or dispersed in a solvent.

Preferably, the coating solution contains a polymerization initiator and a crosslinking agent. These polymerization initiator and crosslinking agent are not particularly limited. The following can be used, for example. Examples of the polymerization initiator include benzoyl peroxide (BPO) and azobisisobutyronitrile (AIBN). Examples of the crosslinking agent include isocyanate crosslinking agent, an epoxy crosslinking agent, and a metal chelate crosslinking agent. One of them can be used individually, or two or more of them can be used in combination. Moreover, the coating solution also can contain additional additives. Examples of the additives include an antioxidant, a denaturant, a surfactant, a dye, a pigment, a discoloration preventing agent, and an ultraviolet absorber. Examples of the antioxidant include phenolic compounds, amine compounds, organic sulfur compounds, and phosphine compounds. Examples of the denaturant include glycols, silicones, and alcohols. The surfactant is used for smoothing the optical compensation layer, for example. Examples thereof include silicone surfactants, acrylic surfactants, and fluorochemical surfactants.

The solvent used for the coating solution is not particularly limited. Examples thereof include: halogenated hydrocarbons such as chloroform, dichloromethane, carbon tetrachloride, dichloroethane, tetrachloroethane, methylene chloride, trichloroethylene, tetrachloroethylene, chlorobenzene, and orthodichlorobenzene; phenols such as phenol, p-chlorophenol, o-chlorophenol, m-cresol, o-cresol, and p-cresol; aromatic hydrocarbons such as benzene, toluene, xylene, mesitylene, methoxybenzene, and 1,2-dimethoxybenzene; ketone solvents such as acetone, methyl ethyl ketone (MEK), methyl isobutyl ketone (MIBK), cyclohexanone, cyclopentanone, 2-pyrrolidone, and N-methyl-2-pyrrolidone; ester solvents such as ethyl acetate, butyl acetate, and propyl acetate; alcohol solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide solvents such as dimethylformamide and dimethylacetamide; nitrile solvents such as acetonitrile and butyronitrile; ether solvents such as diethyl ether, dibutyl ether, tetrahydrofuran, and dioxane; and carbon disulfide, ethyl cellosolve, butyl cellosolve, and ethyl cellosolve acetate. Among them, preferable solvents are toluene, xylene, mesitylene, MEK, MIBK, cyclohexanone, ethyl cellosolve, butyl cellosolve, ethyl acetate, butyl acetate, propyl acetate, and ethyl cellosolve acetate. One of these solvents may be used individually or two or more of them may be used in combination.

The blending ratio of the liquid crystal monomer in the coating solution is, for example, in the range of 5 to 50 wt %, preferably in the range of 10 to 40 wt %, and more preferably in the range of 15 to 30 wt %, with respect to the total weight of the coating solution.

Next, the coating solution is applied to the surface of the base film that has been subjected to the aligning treatment. The application method to be employed herein is not particularly limited. Examples thereof include roll coating, spin coating, wire bar coating, dip coating, an extrusion method, curtain coating, and spray coating. Among these methods, spin coating and extrusion coating are preferable considering the application efficiency. The amount of the coating solution to be applied is not particularly limited. In an example, when the concentration of liquid crystal monomers in the coating solution is 20 wt %, the amount is, for example, in the range of 0.03 to 0.17 ml, preferably in the range of 0.05 to 0.15 ml, and more preferably in the range of 0.08 to 0.12 ml, per unit area (100 $cm^2$) of the base film.

After the application, the coating film formed on the surface of the base film that has been subjected to the aligning treatment is heated. The temperature condition for the heating treatment can be determined suitably according to, for example, the type of the liquid crystal monomer to be used therein, specifically, the temperature at which the liquid crystal monomer exhibits liquid crystallinity. It is, for example in the range of 40 to 120° C., preferably in the range of 50 to 100° C., and more preferably in the range of 60 to 90° C. Generally, when the above-mentioned temperature is at least 40° C., the liquid crystal monomer can be sufficiently aligned. When it is 120° C. or lower, the number of options of the base film increases in terms, for example, of heat resistance. The time for the heat treatment is, for example, in the range of 30 seconds to 10 minutes, preferably 1 minute to 8 minutes, and more preferably in the range of 2 to 7 minutes.

After the drying treatment, the coating film is subjected to one or both of a polymerization treatment and a crosslinking treatment. When the liquid crystal monomers are polymerized or crosslinked through the polymerization treatment or crosslinking treatment, the liquid crystal monomers are linked to one another to form a three-dimensional network and thereby the alignment state is fixed. When the alignment state has been fixed in this manner, the three-dimensional network is "non-liquid crystalline" and therefore phase transitions to the liquid crystalline phase, glassy phase, and crystalline phase do not occur. The methods of the polymerization treatment and the crosslinking treatment are determined suitably according to, for example, the type of the polymerization initiator and crosslinking agent to be used. For example, when a photopolymerization initiator and photocrosslinking agent are used, the coating film can be irradiated with light. When an ultraviolet polymerization initiator and an ultraviolet crosslinking agent are used, the coating film can be irradiated with ultraviolet rays. Various conditions such as irradiation time, irradiation intensity, and irradiation amount of the light or ultraviolet rays can be determined suitably according to, for example, the type and amount of the liquid crystal monomers as well as the type of polymerization initiator and crosslinking agent.

In this manner, a first optical compensation layer can be formed on a base film. As shown in FIG. 1, the first optical compensation layer 12 is disposed between the polarizer 11 and the second optical compensation layer 13 together with or individually from the base film. When the first optical compensation layer 12 is disposed together with the base film, it is preferable that the base film serve as a protective layer for the polarizer 11. In this case, the first optical compensation layer 12 is disposed in such a manner that the substrate film side thereof is located on the polarizer 11 side. From this point of view, the base film is preferably a film that can serve as a protective layer. Examples of such a film include those described later, and for example, a TAC film is preferable. For the method of disposing the first optical compensation layer 12, any suitable method can be employed according to the intended use. Typically, the first optical compensation layer 12 is provided with a pressure-sensitive adhesive layer (not shown) on each side thereof and is allowed to adhere to the polarizer 11 and the second optical compensation layer 13. With the gaps between the respective layers filled with the pressure-sensitive adhesive layers, when it is incorporated into an image display, the relationship between the optical axes of the respective layers can be prevented from varying or the respective layers can be prevented from being rubbed with each other and being damaged. Furthermore, it is also possible to reduce the reflection at the interface between the layers and thereby to improve contrast when it is used in an image display.

The thickness of the pressure-sensitive adhesive layer can be set suitably according to, for example, the intended use and adhesion. Specifically, the thickness of the pressure-sensitive adhesive layer is preferably in the range of 1 to 100 µm, more preferably in the range of 5 to 50 µm, and most preferably in the range of 10 to 30 µm.

Any suitable pressure-sensitive adhesive can be used as the pressure-sensitive adhesive for forming the pressure-sensitive adhesive layer. Specific examples thereof include a solvent based pressure-sensitive adhesive, a non-aqueous emulsion based pressure-sensitive adhesive, a water based pressure-sensitive adhesive, and a hot melt pressure-sensitive adhesive. A solvent based pressure-sensitive adhesive containing an acrylic polymer as a base polymer is used preferably. This is because it exhibits suitable sticking characteristics (wettability, cohesiveness, and adhesiveness) for the polarizer and the first optical compensation layer and has excellent optical transparency, weather resistance, and heat resistance.

Typical examples of the adhesive for forming the adhesive layer include a curable adhesive. Typical examples of the curable adhesive include energy-beam curable adhesives, photocurable adhesives such as UV curable adhesives, moisture-curable adhesives, and thermosetting adhesives. Specific examples of the thermosetting adhesives include thermosetting resin adhesives such as epoxy resin, isocyanate resin, and polyimide resin. Specific examples of the moisture-curable adhesives include a moisture-curable isocyanate resin adhesive. The moisture-curable adhesive (particularly, the moisture-curable isocyanate resin adhesive) is preferable. The moisture-curable adhesive is cured by reacting with, for example, moisture in the air, water adsorbed at the surface of a part to be bonded, and active hydrogen groups such as a hydroxyl group and a carboxyl group. Accordingly, after application of an adhesive, parts are bonded together, and then allowed to stand, so that the adhesive is allowed to be cured. Therefore, it has excellent handleability. Furthermore, since it is not necessary to heat it to cure it, the second optical compensation layer is not heated during stacking (adhesion). As a result, it is immune to thermal shrinkage. Accordingly, even when the second optical compensation layer is very thin as in the present invention, it can be prevented considerably from, for example, cracking during stacking. Moreover, the curable adhesive hardly expands or contracts even when it is heated after being cured. Therefore, even when the second optical compensation layer is very thin and the resultant polarizing plate is used under high temperature conditions, the second optical compensation layer can be prevented considerably from cracking, for example. The aforementioned isocyanate resin adhesive is a generic term for polyisocyanate adhesives and polyurethane resin adhesives.

The curable adhesive to be used can be, for example, a commercial adhesive or can be prepared as a curable resin adhesive solution (or dispersion) by dissolving or dispersing various curable resins described above in a solvent. When a solution (or a dispersion) is prepared, the ratio of the curable resin contained in the solution is preferably 10 to 80 wt %, more preferably 20 to 65 wt %, particularly preferably 25 to 65 wt %, and most preferably 30 to 50 wt %, in terms of solid content weight. For the solvent to be used, any suitable solvent can be employed according to the type of the curable resin. Specific examples thereof include ethyl acetate, methyl ethyl ketone, methyl isobutyl ketone, toluene, and xylene. They can be used individually or two or more of them can be used in combination.

The amount of the adhesive to be applied to the first optical compensation layer can be set suitably according to the intended use. For example, the amount of the adhesive to be applied per unit area ($cm^2$) of the first optical compensation layer is preferably 0.3 to 3 ml, more preferably 0.5 to 2 ml, and most preferably 1 to 2 ml. After application, the solvent contained in the adhesive is volatilized by natural drying or drying by heating as required. The thickness of the adhesive layer thus obtained is preferably 0.1 to 20 μm, more preferably 0.5 to 15 μm, and most preferably 1 to 10 μm. Furthermore, the indentation microhardness of the adhesive layer is preferably 0.1 to 0.5 GPa, more preferably 0.2 to 0.5 GPa, and most preferably 0.3 to 0.4 GPa. Since the correlation between the indentation microhardness and the Vickers microhardness is known, the indentation microhardness can be expressed in terms of the Vickers microhardness. The indentation microhardness can be calculated from indentation depth and indentation load by using, for example, a thin film hardness tester (for example, MH4000 (trade name) and MHA-400 (trade name)) manufactured by NEC Corporation.

A-3. Second Optical Compensation Layer

A-3-1. Overall Configuration of Second Optical Compensation Layer

The second optical compensation layer 13 has a relationship of nx=ny>nz and can serve as a so-called negative C plate. Since the second optical compensation layer has such a refractive index distribution, it can suitably compensate the birefringent properties of the liquid crystal layer, particularly of a VA mode liquid crystal cell. As a result, a liquid crystal display with prominently improved viewing angle properties can be obtained. As described above, in the present invention, "nx=ny" embraces not only the case where nx and ny are exactly equal to each other but also the case where nx and ny are substantially equal to each other. Accordingly, the second optical compensation layer can have in-plane retardation and a slow axis. The in-plane retardation $Re_2$ of the second optical compensation layer (negative C plate) is, for example, 0 to 20 nm, preferably 0 to 10 nm, and further preferably 0 to 5 nm.

The thickness direction retardation $Rth_2$ of the second optical compensation layer 13 is 30 to 400 nm, preferably 60 to 260 nm, and most preferably 100 to 180 nm. The thickness of the second optical compensation layer that can obtain such thickness direction retardation can vary according to, for example, the material to be used. For example, the thickness of the second optical compensation layer is preferably 1 to 60 μm, more preferably 1 to 55 μm, and most preferably 1 to 50 μm. When the second optical compensation layer is composed of the below-mentioned cholesterically aligned and solidified layer alone, the thickness thereof is preferably 1 to 20 μm, more preferably 1 to 15 μm, and most preferably 1 to 5 μm. For example, when the cholesterically aligned and solidified layer has a thickness of about 2 μm, the thickness direction retardation $Rth_c$ is about 110 to 120 nm. As described above, the thickness of the second optical compensation layer composed of a cholesterically aligned and solidified layer alone is thinner than that (for example, at least 60 μm) of the negative C plate formed by biaxial stretching. Thus, it can greatly contribute to a reduction in thickness of image displays. Furthermore, when the second optical compensation layer is formed to be very thin, thermal irregularity can considerably be prevented from occurring. Moreover, such a very thin optical compensation layer is also preferable from viewpoints of, for example, the prevention of irregularities in cholesteric alignment and a transmittance drop, selective reflection properties, prevention of coloration, and productivity. The second optical compensation layer (negative C plate) in the present invention can be formed of any suitable material, as long as it allows the thickness and optical properties as described above to be obtained. Preferably, a very thin negative C plate such as the above can be obtained by forming cholesteric alignment with a liquid crystal compound and fixing the cholesteric alignment, i.e. by using a cholesterically aligned and solidified layer (the material for forming the cholesteric alignment and the method of fixing the cholesteric alignment are described later in detail). Furthermore, it is also preferable that the second optical compensation layer is formed of a non-liquid crystal polymer such as polyimide. In this case, large thickness direction retardation $Rth_2$ can be obtained even when it is thin. Accordingly, the thickness of the second optical compensation layer can be reduced. The thickness of the second optical compensation layer formed of a non-liquid crystal polymer such as polyimide is, for example, in the range of 0.5 to 3 μm, preferably 0.7 to 2.5 μm, and more preferably in the range of 1 to 2.5 μm. When a polarizing plate with optical compensation layers of the present invention is used in a VA mode liquid crystal display, it is preferable that the second optical compensation layer is formed of a non-liquid crystal polymer such as polyimide. This is because the polarizing plate with optical compensation layers of the present invention having a second optical compensation layer formed of a non-liquid crystal polymer such as polyimide matches well with a VA mode liquid crystal display in wavelength dispersion characteristics, and as a result, particularly good display properties can be obtained.

The second optical compensation layer 13 is formed, for example, of a cholesterically aligned and solidified layer with a selective reflection wavelength range of 350 nm or shorter. The upper limit of the selective reflection wavelength range is further preferably 320 nm or shorter and most preferably 300 nm or shorter. On the other hand, the lower limit of the selective reflection wavelength range is preferably at least 100 nm and further preferably at least 150 nm. When the selective reflection wavelength range exceeds 350 nm, it enters the visible light region and therefore, for example, problems of coloration and decoloration may occur in some cases. When the selective reflection wavelength range is shorter than 100 nm, an excessively large amount of chiral dopant (described later) is to be used and thereby it is necessary to control the temperature extremely accurately in forming the optical compensation layer. As a result, the polarizing plate may be difficult to produce in some cases.

The helical pitch in the cholesterically aligned and solidified layer is preferably 0.01 to 0.25 μm, more preferably 0.03 to 0.20 μm, and most preferably 0.05 to 0.15 μm. When the helical pitch is at least 0.01 μm, for example, sufficient alignment can be obtained. When the helical pitch is 0.25 μm or shorter, for example, the optical rotatory power on a shorter wavelength side of visible light can be sufficiently suppressed and thereby, for example, light leakage can be sufficiently prevented from occurring. The helical pitch can be controlled through adjustment of the amount and type (twisting power) of the chiral dopant described later. With the adjustment of the helical pitch, the selective reflection wavelength range can be controlled in a desired range.

Moreover, the second optical compensation layer 13 may have a layered structure composed of the cholesterically aligned and solidified layer and a layer formed of a film (hereinafter also referred to as a "plastic film layer") that has a relationship of nx=ny>nz and that contains a resin having an absolute value of a photoelastic coefficient of $2 \times 10^{-11}$ m$^2$/N or lower. Typical examples of the material that can form the plastic film layer (resin that can satisfy such a photoelastic coefficient) include cyclic olefin resins and cellulose resins. The cyclic olefin resins and cellulose resins are described below in detail. A cellulose resin film (typified by a TAC film) is a film having a relationship of nx=ny>nz.

The absolute value of a photoelastic coefficient of the plastic film layer is $2 \times 10^{-11}$ m$^2$/N or lower. With the photoelastic coefficient being in the above-mentioned range, the retardation change tends not to be caused when shrinkage stress is generated during heating. Accordingly, a plastic film layer exhibiting such a photoelastic coefficient can prevent thermal irregularities from occurring in a resultant image display. The photoelastic coefficient is preferably in the range of $2.0 \times 10^{-13}$ to $1.0 \times 10^{-11}$ m$^2$/N and more preferably in the range of $1.0 \times 10^{-13}$ to $1.0 \times 10^{-11}$ m$^2$/N.

The cyclic olefin resin is a generic term for resins that are polymerized with cyclic olefin serving as a polymerization unit. Examples thereof include resins described in JP 1(1989)-240517 A, JP 3 (1991)-14882 A, and JP 3 (1991)-122137 A. Specific examples thereof include ring-opening (co)polymers of cyclic olefin, addition polymers of cyclic olefin, copolymers of cyclic olefin and alpha-olefin such as ethylene or propylene (typified by a random copolymer), and grafted products obtained by modifying those with unsaturated carboxylic acid or a derivative thereof, and hydrides thereof. Specific examples of cyclic olefin include norbornene monomers.

Examples of the norbornene monomers include norbornene as well as alkyl- and alkylidene-substituted products thereof, for example, 5-methyl-2-norbornene, 5-dimethyl-2-norbornene, 5-ethyl-2-norbornene, 5-butyl-2-norbornene, 5-ethylidene-2-norbornene, and substitution products thereof with a polar group such as a halogen; dicyclopentadiene and 2,3-dihydrodicyclopentadiene; dimethano-octahydronaphthalene, alkyl- and/or alkylene-substituted products thereof, and substitution products thereof with a polar group such as a halogen, for example, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; and trimers and tetramers of cyclopentadiene, for example, 4,9:5,8-dimethano-3a,4,4a,5,8,8a,9,9a-octahydro-1H-benzoindene, and 4,11:5,10:6,9-trimethano-3a,4,4a,5,5a,6,9,9a,10,10a,11,11a-dodecahydro-1H-cyclopentaanthracene.

In the present invention, other ring-opening polymerizable cycloolefins can be used in combination as long as the object of the present invention is not impaired. Specific examples of such cycloolefins include compounds having a reactive double bond, such as cyclopentene, cyclooctene, and 5,6-dihydrodicyclopentadiene.

In the cyclic olefin resins, the number average molecular weight (Mn) determined by gel permeation chromatography (GPC) using a toluene solvent is preferably in the range of 25000 to 200000, more preferably in the range of 30000 to 100000, and most preferably in the range of 40000 to 80000. A number average molecular weight in the aforementioned ranges makes it possible to obtain a plastic film layer with excellent mechanical strength as well as good solubility, formability, and casting operability.

When the cyclic olefin resin is obtained through hydrogenation of a ring-opening polymer of norbornene monomers, a hydrogenation rate is preferably at least 90%, more preferably at least 95%, and most preferably at least 99%. When the hydrogenation rate is in the ranges as described above, the cyclic olefin resin has excellent thermal degradation resistance and light degradation resistance.

Various products of the cyclic olefin resin are commercially available. Specific examples thereof include: "ZEONEX" and "ZEONOR" (trade names) manufactured by Zeon Corporation; "ARTON" (trade name) manufactured by JSR Corporation; "TOPAS" (trade name) manufactured by Ticona; and "APEL" (trade name) manufactured by Mitsui Chemical Corporation.

Any suitable cellulose resin (typically, an ester of cellulose and an acid) may be employed as the cellulose resin. An ester composed of cellulose and fatty acid is preferred. Examples of such cellulose resin include cellulose triacetate (triacetyl cellulose: TAC), cellulose diacetate, cellulose tripropionate, and cellulose dipropionate. Among them, TAC is preferred. This is because TAG has a low birefringence and a high transmittance, many TAC products are commercially available, and thus TAC is advantageous in terms of availability and cost.

Examples of commercially available products of TAC include: "UV-50", "UV-80", "SH-50"), "SH-80", "TD-80U", "TD-TAC", and "UZ-TAC" (trade names) manufactured by Fuji Photo Film Co., Ltd.; "KC SERIES" (trade name) manufactured by Konica Minolta Holdings, Inc.; and "TRI-ACETYL CELLULOSE 80 MM SERIES" (trade name) manufactured by Lonza Japan. Among them, "TD-80U" is preferred because of excellent transmittance and durability. "TD-80U" has excellent adaptability particular to a TFT type liquid crystal display.

The plastic film layer can be produced by forming the cyclic olefin resin or the cellulose resin into a film shape. The forming method is not particularly limited. Examples thereof include a compression molding method, a transfer molding method, an injection molding method, an extrusion molding method, a blow molding method, a powder molding method, an FRP molding method, and a cast molding (casting) method. Particularly, the extrusion molding method and the cast molding (casting) method are preferred. Since many molded films of the cyclic olefin resin or the cellulose resin are commercially available, commercially available films also can be used.

A-3-2. Liquid Crystal Composition for Forming Second Optical Compensation Layer (Cholesterically Aligned and Solidified Layer): Liquid Crystal Compound The second optical compensation layer (cholesterically aligned and solidified layer) can be formed of a liquid crystal compound. A liquid crystal compound whose liquid crystalline phase is a nematic phase (i.e. a nematic liquid crystal) is preferable as the liquid crystal compound. For example, liquid crystal polymers and liquid crystal monomers can be used as such a liquid crystal compound. The mechanism of expressing the liquid crystallinity of the liquid crystal compound can be lyotropic or thermotropic. The alignment state of the liquid crystal is preferably homogeneous alignment. As described later, the second optical compensation layer is formed by using a liquid crystal solution (coating solution) containing a liquid crystal compound. The content of the liquid crystal compound in the liquid crystal solution is preferably 75 to 95 wt % and more preferably 80 to 90 wt %. When the content of the liquid crystal compound is smaller than 75 wt %, it does not sufficiently exhibit the liquid crystal state, which may result in insufficient formation of cholesteric alignment. On the other hand, a content of the liquid crystal compound exceeding 95 wt % reduces the content of chiral dopant and thereby twisting may not be sufficiently provided, which may result in insufficient formation of cholesteric alignment.

The liquid crystal compound is preferably liquid crystal monomers (for example, polymerizable monomers and crosslinking monomers). This is because, as described above, when liquid crystal monomers are polymerized or crosslinked, the alignment state of the liquid crystal monomers can be fixed. When, for example, the liquid crystal monomers are polymerized or crosslinked to each other after the liquid crystal monomers are aligned, the alignment state can be fixed accordingly. In this case, polymers are formed through the polymerization and a three-dimensional network is formed through the crosslinking. These are non-liquid crystalline. Therefore the second optical compensation layer thus formed does not undergo transitions to a liquid crystalline phase, glassy phase, and crystalline phase caused by temperature change that are peculiar to the liquid crystal compound, for example. As a result, the second optical compensation layer is an optical compensation layer that is not affected by temperature change and that has very high stability.

For the liquid crystal monomers, for example, those described for the first optical compensation layer can be used, and the temperature at which the liquid crystal monomers exhibit liquid crystallinity may also be the same as described above.

A-3-3. Liquid Crystal Composition for Forming Second Optical Compensation Layer (Cholesterically Aligned and Solidified Layer): Chiral Dopant Preferably, the liquid crystal solution (liquid crystal composition) that can form the second optical compensation layer (cholesterically aligned and solidified layer) contains a chiral dopant. The content of the chiral dopant in the liquid crystal composition is preferably 5 to 23 wt % and more preferably 8 to 20 wt %. When the content is smaller than 5 wt %, twist may not be sufficiently provided and thereby the cholesteric alignment may not be sufficiently formed. As a result, it may be difficult to control the selective reflection wavelength range of the resultant optical compensation layer in a desired range (shorter wavelength side) in some cases. In the case of a content exceeding 23 wt %, since the liquid crystal compound is in a liquid crystal state in a very narrow temperature range, the temperature needs to be controlled highly accurately during formation of the optical compensation layer. As a result, the production of a polarizing plate may become difficult in some cases. One chiral dopant can be used individually or two or more of them can be used in combination.

Any suitable material that can align the liquid crystal compound into a desired cholesteric structure can be employed as the chiral dopant. For example, the twisting power of such a chiral dopant is preferably at least $1\times10^{-6}$ $nm^{-1}\cdot(wt\%)^{-1}$, more preferably $1\times10^{-5}$ $nm^{-1}\cdot(wt\%)^{-1}$ to $1\times10^{-2}$ $nm^{-1}\cdot(wt\%)^{-1}$, and most preferably $1\times10^{-4}$ $nm^{-1}\cdot(wt\%)^{-1}$ to $1\times10^{-3}$ $nm^{-1}\cdot(wt\%)^{-1}$. The use of a chiral dopant having such twisting power makes it possible to control the helical pitch of the cholesterically aligned and solidified layer in a desired range. As a result, the selective reflection wavelength range can be controlled in a desired range. For example, in the case of using chiral dopants having the same twisting power, the selective reflection wavelength range of the resultant optical compensation layer is shifted to the shorter wavelength side with an increase in the content of the chiral dopant in the liquid crystal composition. On the other hand, in the case where chiral dopants are contained in liquid crystal compositions in the same amount, the selective reflection wavelength range of the resultant optical compensation layer is shifted to the shorter wavelength side with an increase in the twisting power of the chiral dopant. More specific examples are described below. That is, when the selective reflection wavelength range of the optical compensation layer to be formed is set in the range of 200 to 220 nm, a chiral dopant having a twisting power of $5\times10^{-4}$ $nm^{-1}\cdot(wt\%)^{-1}$ is allowed to be contained in the liquid crystal composition at a ratio of 11 to 13 wt %, for example. In the case where the selective reflection wavelength range of the optical compensation layer to be formed is set in the range of 290 to 310 nm, the chiral dopant having a twisting power of $5\times10^{-4}$ $nm^{-1}\cdot(wt\%)^{-1}$ is allowed to be contained in the liquid crystal composition at a ratio of 7 to 9 wt %, for example.

The chiral dopant is preferably a polymerizable chiral dopant. Examples thereof are those described in paragraphs 0048 to 0055 in JP 2003-287623 A. Chiral dopants represented by Chemical Formulas (17) to (37) below are preferable as the above-mentioned chiral dopant. The twisting power of the chiral dopants represented by Chemical Formulas (17) to (37) below are at least $1\times10^{-6}$ $nm^{-1}\cdot(wt\%)^{-1}$. One of the chiral dopants can be used individually, or two or more of them can be used in combination.

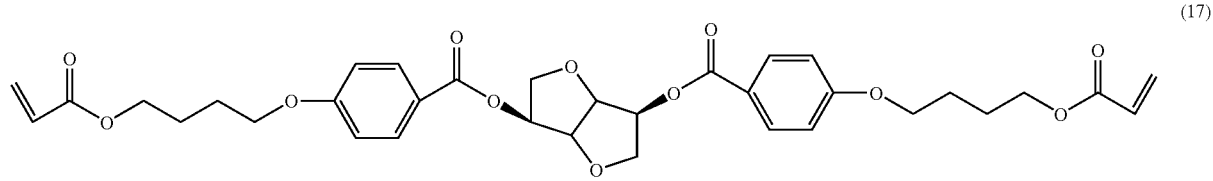

(17)

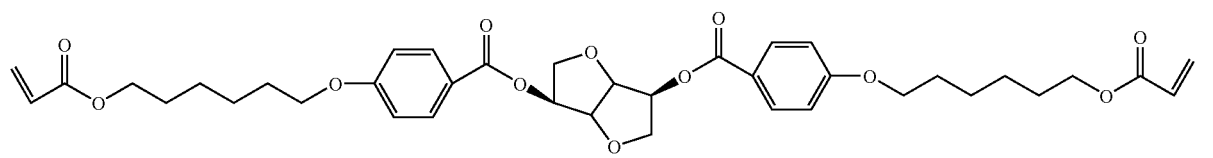

(18)

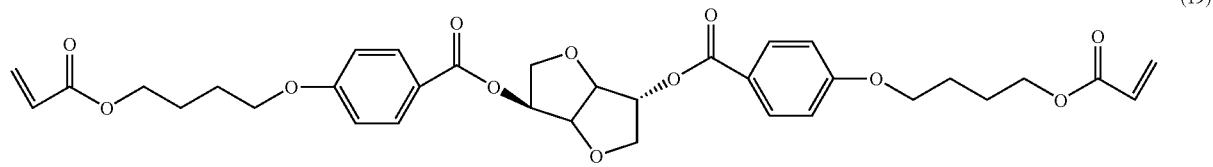

(19)

-continued
(20)
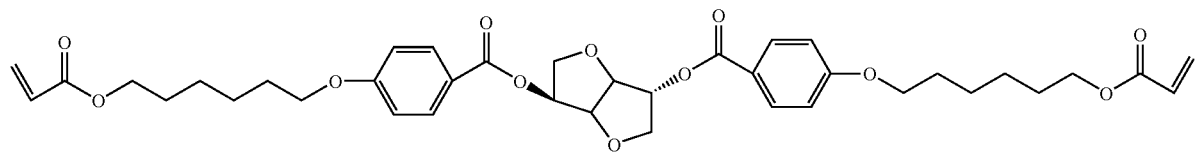
(21)
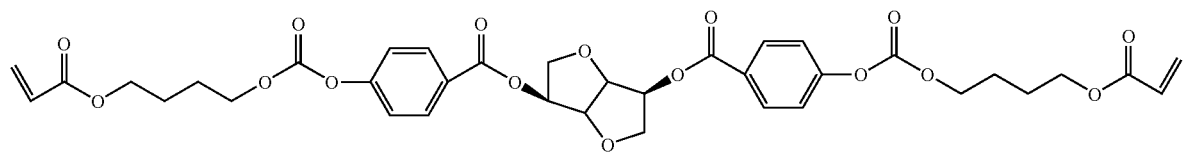
(22)
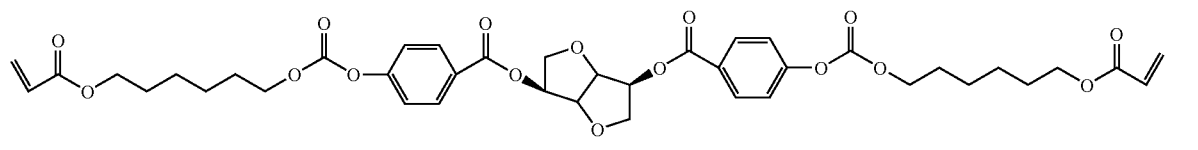
(23)
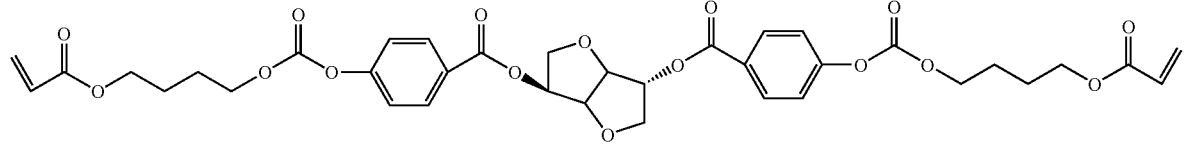
(24)
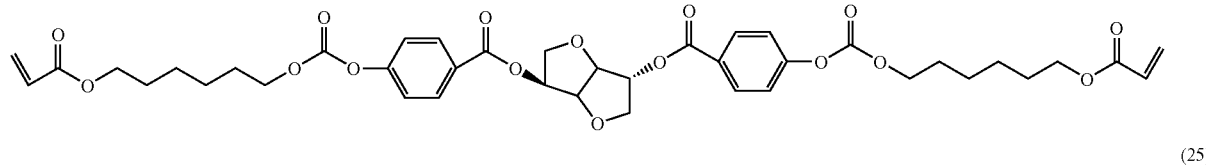
(25)
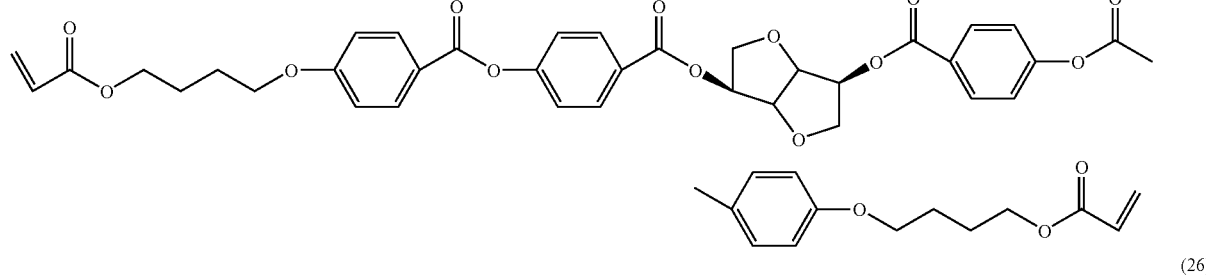
(26)
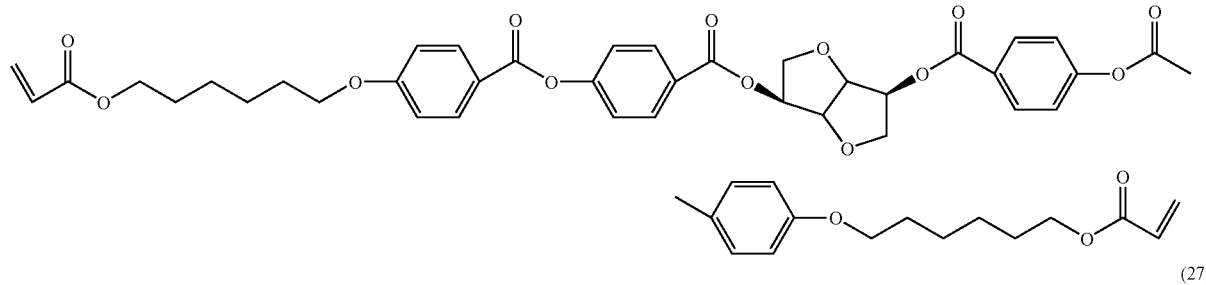
(27)
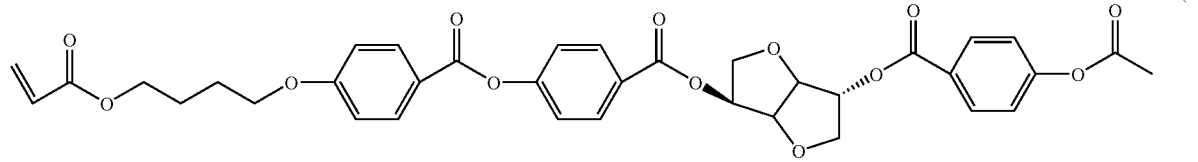

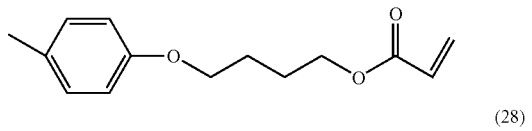
(28)
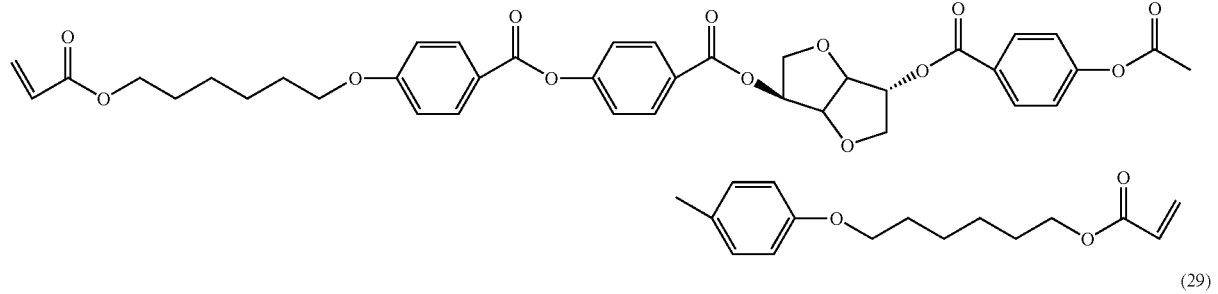
(29)
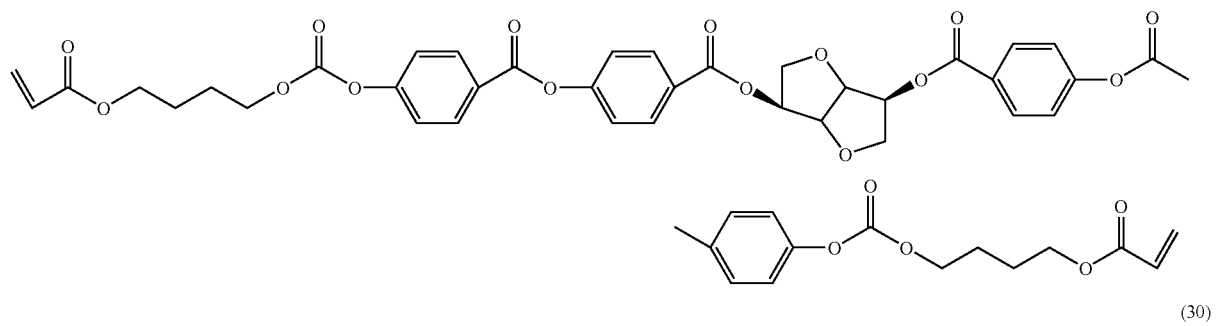
(30)
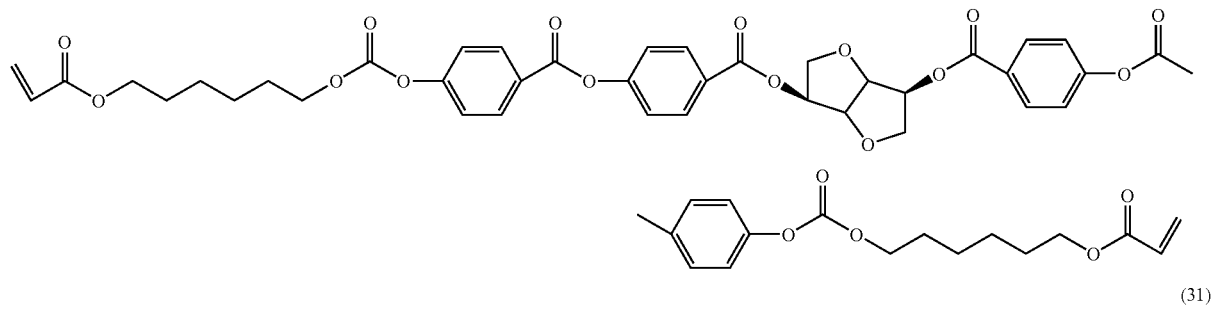
(31)
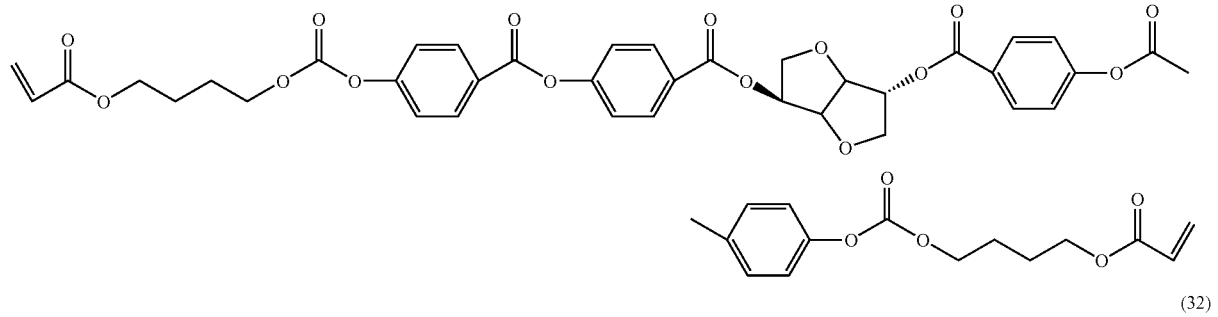
(32)
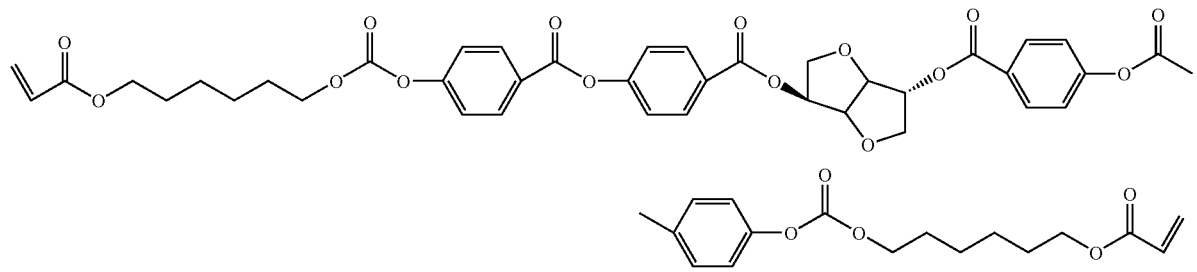

-continued

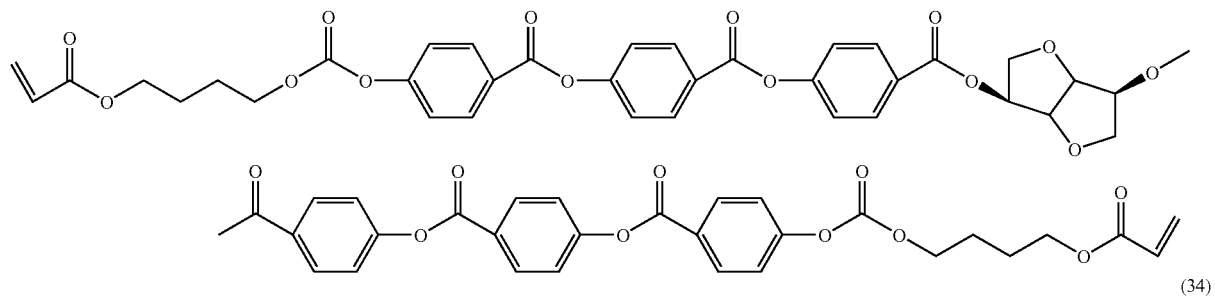

(33)

(34)

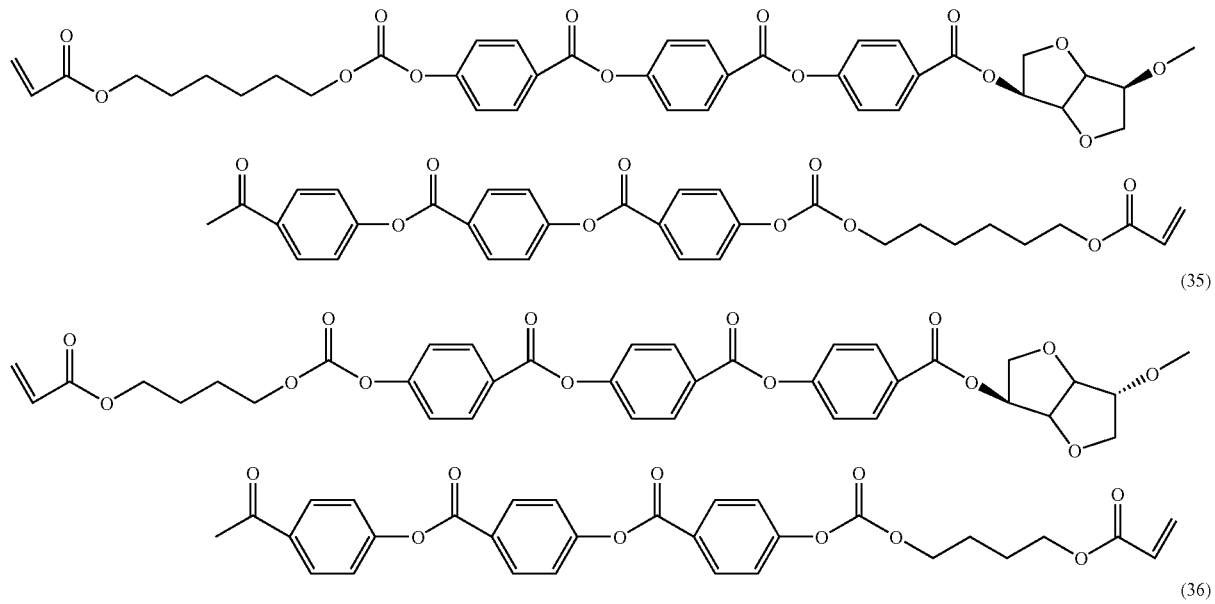

(35)

(36)

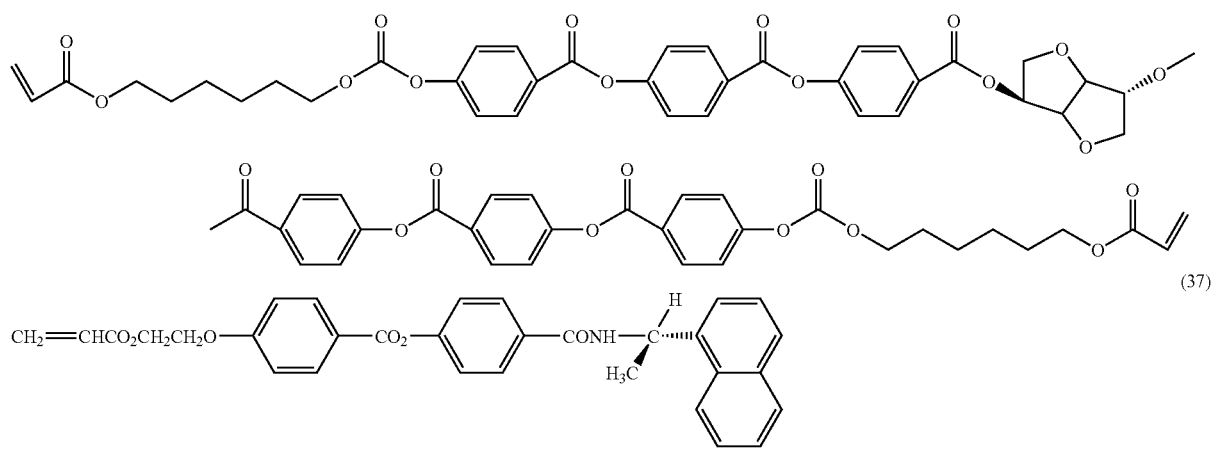

(37)

Beside the above-mentioned chiral compounds, those described, for example, in RE-A4342280, as well as German Patent Application Nos. 19520660.6 and 19520704.1 also can be used preferably.

Any suitable combination of the liquid crystal compound and the chiral dopant can be employed according to the intended use. Examples of the particularly typical combinations include a combination of a liquid crystal monomer of Formula (7) described above and a chiral dopant of Formula (31) described above, and a combination of a liquid crystal monomer of Formula (8) described above and a chiral dopant of Formula (32) described above.

A-3-4. Liquid Crystal Composition for Forming Second Optical Compensation Layer (Cholesterically Aligned and Solidified Layer): Other Additives Preferably, the liquid crystal composition, of which the second optical compensation layer (cholesterically aligned and solidified layer) can be formed, further contains at least one of a polymerization initiator and a crosslinking agent (curing agent). With the use of a polymerization initiator and/or a crosslinking agent (curing agent), the cholesteric structure (cholesteric alignment) formed of the liquid crystal compound in a liquid crystal state can be fixed. For such a polymerization initiator or crosslinking agent, any suitable material can be used as long as the effects of the invention can be obtained. Examples of the polymerization initiator include benzoyl peroxide (BPO) and azobisisobutyronitrile (AIBN). Examples of the crosslinking agent (curing agent) include an ultraviolet curing agent, a photocuring agent, or a thermosetting agent. More specifically, examples thereof include isocyanate crosslinking agent, an epoxy crosslinking agent, and a metal chelate crosslinking agent. These agents may be used individually or in combination of two or more. The content of the polymerization initiator or crosslinking agent in a liquid crystal composition is preferably 0.1 to 10 wt %, more preferably 0.5 to 8 wt %, and most preferably 1 to 6 wt %. When the content thereof is smaller than 0.1 wt %, the cholesteric structure may not be sufficiently fixed in some cases. In the case where the content thereof exceeds 10 wt %, since the temperature range in which the liquid crystal compound is in a liquid crystal state becomes narrow, it may become difficult to control the temperature during the formation of the cholesteric structure in some case.

The liquid crystal composition further can contain any suitable additives as required. Examples of the additives include an antioxidant, a denaturant, a surfactant, a dye, a pigment, a discoloration preventing agent, and an ultraviolet absorber. These additives may be used individually or in combination of two or more. More specifically, examples of the antioxidant include phenolic compounds, amine compounds, organic sulfur compounds, and phosphine compounds. Examples of the denaturant include glycols, silicones, and alcohols. The surfactant is added, for example, for smoothing the surface of the optical compensation layer. Examples thereof include a silicone surfactant, an acrylic surfactant, and a fluorochemical surfactant. Particularly, a silicone surfactant is preferable.

A-3-5. Method of Forming Second Optical Compensation Layer (Cholesterically Aligned and Solidified Layer)

For the method of forming the second optical compensation layer (cholesterically aligned and solidified layer), any suitable method can be employed as long as a desired cholesterically aligned and solidified layer is obtained. A typical method of forming the second optical compensation layer (cholesterically aligned and solidified layer) include: forming an expanded layer (a coating film) by expanding the liquid crystal composition (a coating solution) on a substrate; heat-treating the expanded layer so that the liquid crystal compound contained in the liquid crystal composition is aligned cholesterically; subjecting the expanded layer to at least one of a polymerization treatment and a crosslinking treatment to fix the alignment of the liquid crystal compound; and transferring the cholesterically aligned and solidified layer formed on the substrate. The specific procedure of this formation method is described below.

First, a liquid crystal compound, a chiral dopant, a polymerization initiator or crosslinking agent, and if necessary, various additives are dissolved or dispersed in a solvent. Thus, a liquid crystal coating solution (a liquid crystal composition) is prepared. The liquid crystal compound, chiral dopant, polymerization initiator, crosslinking agent, and additives are the same as described above. The solvent to be used for the liquid crystal coating solution is not particularly limited. Specific examples thereof include halogenated hydrocarbons such as chloroform, dichloromethane, carbon tetrachloride, dichloroethane, tetrachloroethane, methylene chloride, trichloroethylene, tetrachloroethylene, chlorobenzene, and orthodichlorobenzene; phenols such as phenol, p-chlorophenol, o-chlorophenol, m-cresol, o-cresol, and p-cresol; aromatic hydrocarbons such as benzene, toluene, xylene, mesitylene, methoxybenzene, and 1,2-dimethoxybenzene; ketone solvents such as acetone, methyl ethyl ketone (MEK), methyl isobutyl ketone (MIBK) cyclohexanone, cyclopentanone, 2-pyrrolidone, and N-methyl-2-pyrrolidone; ester solvents such as ethyl acetate, butyl acetate, and propyl acetate; alcohol solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide solvents such as dimethylformamide and dimethylacetamide; nitrile solvents such as acetonitrile and butyronitrile; ether solvents such as diethyl ether, dibutyl ether, tetrahydrofuran, and dioxane; and carbon disulfide, ethyl cellosolve, and butyl cellosolve. Among them, preferable solvents are toluene, xylene, mesitylene, MEK, MIBK, cyclohexanone, ethyl cellosolve, butyl cellosolve, ethyl acetate, butyl acetate, propyl acetate, and ethyl cellosolve acetate. These solvents may be used individually or in combination of two or more.

The viscosity of the liquid crystal coating solution can vary according to the temperature or the content of the liquid crystal compound. For example, when the concentration of the liquid crystal compound in the liquid crystal coating solution is 5 to 70 wt % at approximate room temperature (20 to 30° C.), the viscosity of the coating solution is preferably 0.2 to 20 mPa·S, further preferably 0.5 to 15 mPa·S, and further preferably 1 to 10 mPa·S. More specifically, when the concentration of the liquid crystal compound in the liquid crystal coating solution is 30 wt %, the viscosity of the coating solution is preferably 2 to 5 mPa·S and further preferably 3 to 4 mPa·S. When the viscosity of the coating solution is at least 0.2 mPa·S, the coating solution is prevented very well from flowing during application. Furthermore, when the viscosity of the coating solution is 20 mPa·S or lower, an optical compensation layer with no thickness unevenness and excellent surface smoothness is obtained, and the coating solution has excellent coatability.

Next, the liquid crystal coating solution is applied onto a substrate to form an expanded layer. Any suitable method (typically, a method of allowing a coating solution to flow and expand) can be employed as the method of forming the expanded layer. Specific examples thereof include roll coating, spin coating, wire bar coating, dip coating, an extrusion method, curtain coating, and spray coating. Among them, the spin coating and extrusion coating are preferable from a viewpoint of the application efficiency.

The amount of the liquid crystal coating solution to be applied can be set suitably according to, for example, the concentration of the coating solution or the thickness of an intended layer. For example, when the concentration of the liquid crystal compound in the coating solution is 20 wt %, the amount thereof to be applied is preferably 0.03 to 0.17 ml, further preferably 0.05 to 0.15 ml, and most preferably 0.08 to 0.12 ml, per unit area (100 cm$^2$) of substrate.

Any suitable substrate that allows the liquid crystal material to be aligned can be employed as the substrate.

Examples of the substrate include base films formed of various plastics. The plastics are not particularly limited. Examples thereof include triacetyl cellulose (TAC), polyolefin such as polyethylene, polypropylene, and poly(4-methyl pentene-1), polyimide, polyimide amide, polyetherimide, polyamide, polyether ether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, acrylic resin, polyvinyl alcohol, polypropylene, cellulose plastics, epoxy resin, and phenolic resin. Furthermore, it is also possible to use those obtained by placing a plastic film or sheet such as the above on the surface of, for example, a substrate made of metal such as aluminum, copper, or steel, a ceramic substrate, or a glass substrate. Moreover, it is possible to use those obtained by forming a $SiO_2$ obliquely deposited film on the surface of the substrate or the plastic film or sheet. The thickness of the substrate is preferably, 5 to 500 μm, more preferably 10 to 200 μm, and most preferably 15 to 150 μm. When the substrate has such thickness, it has a sufficiently high strength to be used as a substrate and therefore problems such as, for example, breakage during production can be prevented from occurring.

Next, the expanded layer is heat-treated and thereby the liquid crystal compound is allowed to be aligned in such a manner as to exhibit a liquid crystalline phase. Since the expanded layer contains a chiral dopant together with the liquid crystal compound, the liquid crystal compound is aligned while being provided with a twist in such a manner as to exhibit a liquid crystalline phase. As a result, the expanded layer (or the liquid crystal compound forming it) shows a cholesteric structure (a helical structure).

The temperature condition for the heat treatment can be set suitably according to the type of the liquid crystal compound (specifically the temperature at which the liquid crystal compound exhibits the liquid crystallinity). More specifically, the heating temperature is preferably 40 to 120° C., more preferably 50 to 100° C., and most preferably 60 to 90° C. Usually, a heating temperature of at least 40° C. allows the liquid crystal compound to be sufficiently aligned. On the other hand, a heating temperature of 120° C. or lower allows the substrate to be selected from a wider range when, for example, heat resistance is taken into account, and therefore allows a most suitable substrate to be selected according to the liquid crystal compound. Furthermore, the heating time is preferably at least 30 seconds, more preferably at least one minute, particularly preferably at least two minutes, and most preferably at least four minutes. When the heating time is shorter than 30 seconds, the liquid crystal compound may not be sufficiently brought into a liquid crystal state. On the other hand, the heating time is preferably ten minutes or shorter, more preferably eight minutes or shorter, and most preferably seven minutes or shorter. When the heating time exceeds 10 minutes, additives may possibly sublime.

Next, with the liquid crystal compound showing the cholesteric structure, the expanded layer is subjected to a polymerization treatment or a crosslinking treatment, and thereby the alignment (cholesteric structure) of the liquid crystal compound is fixed. More specifically, when the polymerization treatment is carried out, the liquid crystal compound (for example, polymerizable monomers) and/or chiral dopant (polymerizable chiral dopant) are/is polymerized and the polymerizable monomers and/or polymerizable chiral dopant are/is fixed as a repeating unit of polymer molecules. When the crosslinking treatment is carried out, the liquid crystal compound (crosslinkable monomers) and/or chiral dopant form(s) a three-dimensional network, and the crosslinkable monomers and/or chiral dopant are/is fixed as a part of the crosslinked structure. As a result, the alignment state of the liquid crystal compound is fixed. The polymer or three-dimensional network that is formed through polymerization or crosslinking of the liquid crystal compound is "non-liquid crystalline". Accordingly, the resultant second optical compensation layer does not undergo transition to a liquid crystalline phase, glassy phase, or crystalline phase caused by temperature change that are peculiar to the liquid crystal compound, for example. Accordingly, no change in alignment is caused by temperature change. As a result, the resultant second optical compensation layer can be used as a high-performance optical compensation layer that is not affected by temperature. Furthermore, the second optical compensation layer can considerably prevent, for example, light leakage from occurring, because the selective reflection wavelength range thereof is optimized in the range of 100 nm to 320 nm.

The specific procedure for the polymerization treatment or crosslinking treatment can be selected suitably according to the type of polymerization initiator and crosslinking agent to be used. For example, when a photopolymerization initiator or a photocrosslinking agent is used, light irradiation can be carried out. On the other hand, when an ultraviolet polymerization initiator or an ultraviolet crosslinking agent is used, ultraviolet irradiation can be carried out. Furthermore, when a thermal polymerization initiator or crosslinking agent is used, heating can be carried out. For example, the irradiation time and intensity as well as total irradiation amount of light or ultraviolet rays can be set suitably according to, for example, the type of the liquid crystal compound and substrate, and the properties desired for the second optical compensation layer. Similarly, for example, the heating temperature and time also can be set suitably according to the intended use.

The cholesterically aligned and solidified layer thus formed on a substrate is transferred to the surface of the first optical compensation layer to serve as the second optical compensation layer. When the second optical compensation layer has a layered structure including a cholesterically aligned and solidified layer and a plastic film layer, the plastic film layer is bonded to the first optical compensation layer, with a pressure-sensitive adhesive layer being interposed therebetween, while the cholesterically aligned and solidified layer is transferred to the plastic film layer. Thus, the second optical compensation layer is formed. Alternatively, it is also possible to form a laminate by bonding a plastic film layer to a cholesterically aligned and solidified layer formed on a substrate, with an adhesive layer being interposed therebetween, and to bond the laminate to the surface of the first optical compensation layer, with a pressure-sensitive adhesive layer being interposed therebetween. The thickness of the adhesive layer is preferably 1 to 10 μm and most preferably 1 to 5 μm. The transfer process further includes separating the base from the second optical compensation layer. With respect to the curable adhesive, the same description as that made in section A-2 above applies. With respect to the plastic film layer, the same description as that made in section A-3-1 above applies.

Such typical examples of the method of forming the second optical compensation layer as described above employ liquid crystal monomers (for example, polymerizable monomers or crosslinkable monomers) as liquid crystal compounds. In the present invention, however, the method of forming the second optical compensation layer is not limited to such methods and can be a method in which a liquid crystal polymer is used. However, a method in which liquid crystal monomers are used as described above is preferred. The use of liquid crystal monomers makes it possible to form a thinner optical compensation layer with a further better optical compensation function. Specifically, the use of liquid crystal monomers makes it easier to control the selective reflection wavelength range. Moreover, for example, the viscosity of the coating solution is easy to set, and therefore a very thin second optical compensation layer can be formed more easily and it also has excellent handleabilty. Additionally, the surface of the resultant optical compensation layer has further improved flatness.

A-3-6. Second Optical Compensation Layer Formed Using Non-Liquid Crystal Polymer As described above, the second optical compensation layer can be formed using a non-liquid crystal polymer. Such a second optical compensation layer can be formed by applying a non-liquid crystal polymer solution onto a base film and then evaporating the solvent contained in the solution to remove it.

As described above, the non-liquid crystal polymer is preferably a polymer such as polyamide, polyimide, polyester, polyetherketone, polyaryletherketone, polyamide imide, and polyesterimide because of its excellent heat resistance, chemical resistance, transparency, and hardness. With respect to these polymers, one of them can be used individually, or a mixture of two or more polymers having different functional groups from each other, for example, a mixture of polyaryletherketone and polyamide can be used. Among these polymers, polyimide is particularly preferable because of its high transparency, high alignability, and high stretchability.

The molecular weight of the aforementioned non-liquid crystal polymer is not particularly limited. For example, the weight average molecular weight (Mw) thereof is preferably in the range of 1000 to 1000000 and more preferably in the range of 2000 to 500000.

For the polyimide, a polyimide that has high in-plane alignability and is soluble in an organic solvent is preferred. Specifically, for example, it is possible to use a polymer containing: a condensation polymer product of 9,9-bis(aminoaryl)fluorene and an aromatic tetracarboxylic dianhydride disclosed in JP 2000-511296 A; and at least one repeating unit represented by Formula (A-1) below.

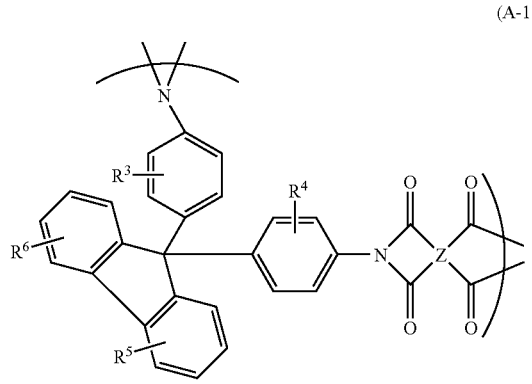

(A-1)

In Formula (A-1), $R^3$ to $R^6$ each are at least one substituent selected independently from the group consisting of hydrogen, halogen, a phenyl group, a phenyl group substituted with 1 to 4 halogen atoms or a C1-10 alkyl group, and a C1-10 alkyl group. Preferably, $R^3$ to $R^6$ each are at least one substituent selected independently from the group consisting of halogen, a phenyl group, a phenyl group substituted with 1 to 4 halogen atoms or a C1-10 alkyl group, and a C1-10 alkyl group.

In Formula (A-1) above, Z is, for example, a C6-20 quadrivalent aromatic group, and preferably is a pyromellitic group, a polycyclic aromatic group, a derivative of a polycyclic aromatic group, or a group represented by Formula (A-2) below.

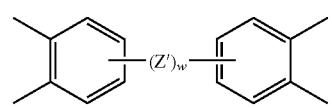

(A-2)

In Formula (A-2) above, Z' is, for example, a covalent bond, a $C(R^7)_2$ group, a CO group, an O atom, an S atom, an $SO_2$ group, an $Si(C_2H_5)_2$ group, or an $NR^8$ group. When a plurality of Z's are present, they are identical to or different from each other. Furthermore, w denotes an integer from 1 to 10. $R^7$s each are independently hydrogen or $C(R^9)_3$. $R^8$ is hydrogen, an C1-20 alkyl group, or a C6-20 aryl group, and when a plurality of $R^8$s are present, they are identical to or different from each other. $R^9$s each are independently hydrogen, fluorine, or chlorine.

Examples of the above-mentioned polycyclic aromatic group include a quadrivalent group derived from naphthalene, fluorene, benzofluorene, or anthracene. Furthermore, examples of a substituted derivative of the above-mentioned polycyclic aromatic group include the above-mentioned polycyclic aromatic group substituted with at least one group selected from the group consisting of, for example, a C1-10 alkyl group, a fluorinated derivative thereof, and halogen such as F and Cl.

Besides those above, examples of the above-mentioned polyimide include a homopolymer whose repeating unit is represented by General Formula CA-3) or (A-4) below or a polyimide whose repeating unit is represented by General Formula (A-5) below that are described in JP 8 (1996)-511812 A. The polyimide represented by Formula (A-5) below is a preferable form of the homopolymer represented by Formula (A-3).

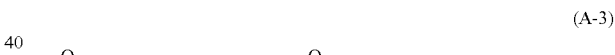

(A-3)

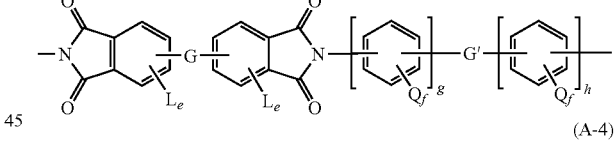

(A-4)

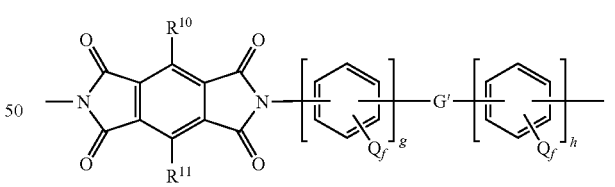

(A-5)

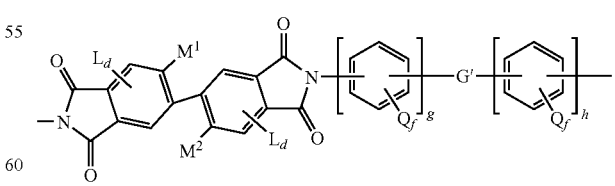

In General Formulas (A-3) to (A-5), G and G' each denote a group selected independently from the group consisting of, for example, a covalent bond, a $CH_2$ group, a $C(CH_3)_2$ group, a $C(CF_3)_2$ group, a $C(CX_3)_2$ group (wherein X is halogen), a CO group, an O atom, an S atom, an $SO_2$ group, an Si(CH$_2$CH$_3$)$_2$ group, and an N(CH$_3$) group. G and G' may be identical to or different from each other.

In Formulas (A-3) and (A-5), L is a substituent, and d and e indicate the number of L substituent groups therein. L is, for example, halogen, a C1-3 alkyl group, a halogenated C1-3 alkyl group, a phenyl group, or a substituted phenyl group, and when a plurality of Ls are present, they are identical to or different from each other. Examples of the above-mentioned substituted phenyl group include a substituted phenyl group having at least one substituent selected from the group consisting of halogen, a C1-3 alkyl group, and a halogenated C1-3 alkyl group. Furthermore, examples of the above-mentioned halogen include fluorine, chlorine, bromine, and iodine. Moreover, d is an integer from 0 to 2, and e is an integer from 0 to 3.

In Formulas (A-3) to (A-5), Q is a substituent, and f indicates the number of Q substituent groups therein. Q is, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group, and a substituted alkyl ester group, and when a plurality of Qs are present, they are identical to or different from each other. Examples of the above-mentioned halogen include fluorine, chlorine, bromine, and iodine. Examples of the above-mentioned substituted alkyl group include a halogenated alkyl group. Examples of the above-mentioned substituted aryl group include a halogenated aryl group. Furthermore, f is an integer from 0 to 4, and g and h are an integer from 0 to 3 and an integer from 1 to 3, respectively. Moreover, g and h are preferably larger than 1.

In Formula (A-4), R$^{10}$ and R$^{11}$ are groups selected independently from the group consisting of hydrogen, halogen, a phenyl group, a substituted phenyl group, an alkyl group, and a substituted alkyl group. Among them, R$^{10}$ and R$^{11}$ each are preferably a halogenated alkyl group independently.

In Formula (A-5), M$^1$ and M$^2$ are identical to or different from each other, and they each are, for example, halogen, a C1-3 alkyl group, a halogenated C1-3 alkyl group, a phenyl group, or a substituted phenyl group. Examples of the above-mentioned halogen include fluorine, chlorine, bromine, and iodine. Examples of the above-mentioned substituted phenyl group include a substituted phenyl group having at least one substituent selected from the group consisting of halogen, a C1-3 alkyl group, and a halogenated C1-3 alkyl group.

Specific examples of the polyimide represented by Formula (A-3) include those represented by Formula (A-6) below. In Formula (A-6), n is the number of the repeating unit in the formula. The n is not particularly limited.

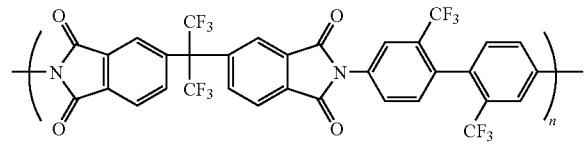

(A-6)

Moreover, examples of the above-mentioned polyimide include a copolymer obtained by suitably copolymerizing, for example, acid dianhydride and diamine other than the above-mentioned skeleton (repeating unit).

Examples of the above-mentioned polyether include polyaryletherketone disclosed in JP 2001-49110 A. Examples of the polyamide or polyester include those described in JP 10(1998)-508048 A.

The base film can be, for example, a plastic film. The plastic is not particularly limited. Examples thereof include cellulose plastic such as triacetyl cellulose (TAC), polyolefin such as polyethylene, polypropylene, and poly(4-methyl pentene-1), polyimide, polyimide amide, polyetherimide, polyamide, polyether ether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, acrylic resin, polyvinyl alcohol, polypropylene, epoxy resin, and phenolic resin. The TAC film is preferred as the base film. The thickness of the base film is, for example, 5 to 500 µm, preferably 10 to 200 µm, and more preferably 15 to 150 µm. When the second optical compensation layer is formed of a non-liquid crystal polymer, it is not necessary to subject the base film surface to an aligning treatment.

As described above, the non-liquid crystal polymer solution is applied onto the base film in the form of a film and the solvent contained in the solution is evaporated to be removed. Thus, the second optical compensation layer is formed.

The solvent of the solution to be applied is not particularly limited. Examples thereof include halogenated hydrocarbons such as chloroform, dichloromethane, carbon tetrachloride, dichloroethane, tetrachloroethane, trichloroethylene, tetrachloroethylene, chlorobenzene, and orthodichlorobenzene; phenols such as phenol and parachlorophenol; aromatic hydrocarbons such as benzene, toluene, xylene, methoxybenzene, and 1,2-dimethoxybenzene; ketone solvents such as acetone, methyl ethyl ketone, methyl isobutyl ketone (MIBK), cyclohexanone, cyclopentanone, 2-pyrrolidone, and N-methyl-2-pyrrolidone; ester solvents such as ethyl acetate, butyl acetate, and propyl acetate; alcohol solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide solvents such as dimethylformamide and dimethylacetamide; nitrile solvents such as acetonitrile and butyronitrile; ether solvents such as diethyl ether, dibutyl ether, and tetrahydrofuran; and carbon disulfide, ethyl cellosolve, and butyl cellosolve. One of these solvents may be used, or two or more of them may be used in combination.

Various additives such as a stabilizer, a plasticizer, and metals can further be blended in the coating solution as required, for example.

Furthermore, the coating solution can contain other resins that are different from those described above. Examples thereof include various general-purpose resins, engineering plastics, thermoplastic resins, and thermosetting resins.

Examples of the general-purpose resins include polyethylene (PE), polypropylene (PP), polystyrene (PS), polymethyl methacrylate (PMMA), ABS resin, and AS resin. Examples of the engineering plastics include polyacetal (POM), polyacetate, polycarbonate (PC), polyamide (PA: NYLON (trade name)), polyethylene terephthalate (PET), and polybutylene terephthalate (PBT). Examples of the thermoplastic resins include polyphenylene sulfide (PPS), polyethersulfone (PES), polyketone (PK), polyimide (PI), polycyclohexanedimethanol terephthalate (PCT), polyarylate (PAR), and liquid crystal polymers (LCP). Examples of the thermosetting resins include epoxy resins and phenolic novolac resins.

When the above-described other resins are blended in the coating solution as described above, the blending amount thereof is, for example, 0 to 50 mass %, preferably 0 to 30 mass %, with respect to the non-liquid crystal polymer.

Examples of the method of applying the solution include spin coating, roll coating, flow coating, printing, dip coating, cast film forming, bar coating, and gravure printing. In application, it is also possible to employ a method of superimposing polymer layers as required.

After application, the solvent contained in the solution is evaporated to be removed, for example, by natural drying, air-drying, or drying by heating (for example, 60 to 250° C.). Thus, the second optical compensation layer is formed. When the non-liquid crystal polymer solution is applied and then the solvent is evaporated to be removed as described above, a layer with an optically uniaxial property (nx=ny>nz) is formed.

A-4. Polarizer

Any suitable polarizer can be employed as the polarizer 11 according to the intended use. Examples thereof include those obtained by allowing a hydrophilic polymer film to adsorb a dichroic material such as iodine or a dichroic dye and then uniaxially stretching it. Examples of the hydrophilic polymer film include polyvinyl alcohol films, partially-formalized polyvinyl alcohol films, and partially-saponified films of ethylene-vinyl acetate copolymer. Furthermore, polyene aligned films such as dehydrated polyvinyl alcohol and dehydrochlorinated polyvinyl chloride can be used, for example. Among them, a polarizer obtained by allowing a polyvinyl alcohol film to adsorb a dichroic material such as iodine and uniaxially stretching the film has a high polarization dichroic ratio and therefore is particularly preferable. The thickness of these polarizers is not particularly limited. Generally, it is about 1 to 80 μm.

The polarizer obtained by allowing a polyvinyl alcohol film to adsorb iodine and uniaxially stretching the film can be produced, for example, by immersing polyvinyl alcohol in an aqueous iodine solution to dye it and then stretching it to 3 to 7 times the original length thereof. The aqueous iodine solution can contain, for example, boric acid, zinc sulfate, or zinc chloride as required. It is also possible to immerse polyvinyl alcohol, for example, in an aqueous potassium iodide solution. Furthermore, before being dyed, a polyvinyl alcohol film can be immersed in water to be washed as required.

Washing the polyvinyl alcohol film not only allows dirt and an anti-blocking agent on the surface of the polyvinyl alcohol film to be washed off but also provides an effect of allowing the polyvinyl alcohol film to swell to prevent nonuniformities such as unevenness in dyeing from occurring. Stretching can be carried out after, during, or before dyeing with iodine. In addition, the film also can be stretched in an aqueous solution of boric acid or potassium iodide or in a water bath.

A-5. Protective Film

Any suitable film that can be used as a protective film for a polarizing plate can be employed as the aforementioned protective film. Specific examples of the material that is a main component of such a film include cellulose resins such as triacetyl cellulose (TAC), and transparent resins of polyester, polyvinyl alcohol, polycarbonate, polyamide, polyimide, polyethersulfone, polysulfone, polystyrene, polynorbornene, polyolefin, acryl, and acetate. Furthermore, thermosetting resins or ultraviolet curable resins of acryl, urethane, acrylic urethane, epoxy, and silicones also can be used. Besides them, for example, glassy polymers such as siloxane polymers also can be used. Moreover, the polymer film described in JP 2001-343529 A (WO 01/37007) also can be used. The material of this film can be a resin composition containing a thermoplastic resin whose side chain has a substituted or unsubstituted imido group and a thermoplastic resin whose side chain has a substituted or unsubstituted phenyl group and nitrile group. Examples of the resin composition include one containing an alternating copolymer of isobutene and N-methyl maleimide and an acrylonitrile-styrene copolymer. The polymer film can be, for example, one formed by extruding the resin composition. Preferable materials are TAC, polyimide resins, polyvinyl alcohol resins, and glassy polymers, and TAC is further preferable.

Preferably, the protective film is transparent and colorless. Specifically, the thickness direction retardation value is preferably −90 nm to +90 nm, more preferably −80 nm to +80 nm, and mores preferably −70 nm to +70 nm.

For the thickness of the film, any suitable thickness can be employed as long as the above-mentioned preferable thickness direction retardation can be obtained. Specifically, the thickness of the protective layer is preferably 5 mm or less, more preferably 1 mm or less, particularly preferably 1 to 500 μm, and most preferably 1 to 150 μm.

The protective film to be provided on the outer side of the polarizer 11 (on the opposite side to the side where the optical compensation layer is disposed) can be subjected to, for example, a hard-coating treatment, an antireflection treatment, an anti-sticking treatment, and an anti-glare treatment as required.

A-6. Other Components of Polarizing Plate

The polarizing plate with optical compensation layers of the present invention can be provided with still another optical layer. For such another optical layer, any suitable optical layer can be employed according to the intended use and type of image displays. Specific examples thereof include liquid crystal films, light scattering films, diffraction films, and yet another optical compensation layers (retardation films).

The polarizing plate with optical compensation layers of the present invention further can have a pressure-sensitive adhesive layer or an adhesive layer as an outermost layer on at least one side thereof. When it has the pressure-sensitive adhesive layer or adhesive layer as the outermost layer as described above, for example, it becomes easy to stack it with another member (for example, a liquid crystal cell), and the polarizing plate can be prevented from separating from another member. Any suitable material can be used as the material for the pressure-sensitive adhesive layer. Specific examples of the pressure-sensitive adhesive include those described in section A-2 above. Specific examples of the adhesive also include those described in section A-2. Preferably, materials with excellent moisture absorption and heat resistance are used. This is because it is possible to prevent foaming or peeling caused by moisture absorption, and degradation in the optical properties and warping of a liquid crystal cell caused, for example, by difference in thermal expansion.

The surface of the pressure-sensitive adhesive layer or adhesive layer can be covered with any suitable separator until the polarizing plate is ready to be used, so that it can be prevented from being contaminated. The separator can be formed by a method in which, for example, any suitable film is provided with a peeling coating by using a silicone-, long-chain alkyl-, fluorine-, or molybdenum sulfide-based peeling agent as required.

The respective layers of the polarizing plate with optical compensation layers of the present invention can be provided with an ultraviolet absorption capability through a treatment with an ultraviolet absorber such as a salicylate compound, a benzophenone compound, a benzotriazole compound, a cyanoacrylate compound, or a nickel complex salt compound.

B. Method of Producing Polarizing Plate with Optical Compensation Layers

The polarizing plate with optical compensation layers of the present invention can be produced by stacking the respective layers, with adhesive layers or pressure-sensitive adhesive layers as described above being interposed therebetween. For the stacking method, any suitable method can be employed as long as the angle (the angle α) formed between the absorption axis of the polarizer and the first optical compensation layer is "plus" or "minus" 25 degrees to 65 degrees. For example, the polarizer, first optical compensation layer, and second optical compensation layer are punched out into a predetermined size, and then are stacked together, with a pressure-sensitive adhesive or adhesive being interposed therebetween, while the directions thereof are aligned so that the angle α is in a desired range. The polarizing plate with optical compensation layers is produced as follows, for example.

First, a first optical compensation layer is bonded to a polarizer. When the first optical compensation layer is formed on a base film, the first optical compensation layer can be transferred through separation and removal of the base film after the first optical compensation layer is bonded to the polarizer. Furthermore, when the base film can serve as a protective layer such as a TAC film, the base film with a first optical compensation layer formed thereon is bonded to a polarizer and thereby a layered structure of the polarizer/base film (protective layer)/first optical compensation layer may be obtained. Next, a second optical compensation layer is bonded to the first optical compensation layer. As in the case of the first optical compensation layer, when the second optical compensation layer is formed on a base film, the second optical compensation layer can be transferred through separation and removal of the base film after the second optical compensation layer is bonded to the first optical compensation layer. Furthermore, when the base film is, for example a TAC film and therefore does not need to be removed, the base film on which the second optical compensation layer has been formed can be bonded to the first optical compensation layer and thereby a layered structure of the first optical compensation layer/base film/second optical compensation layer may be obtained. Thus, the polarizing plate with optical compensation layers of the present invention can be produced.

C. Applications of Polarizing Plate

The polarizing plate with optical compensation layers of the present invention can be used suitably for various image displays (for example, liquid crystal displays and self-light-emitting displays). Specific examples of image displays to which the polarizing plate is applicable include a liquid crystal display, an electroluminescence (EL) display, a plasma display (PD), and a field emission display (FED). When a polarizing plate with optical compensation layers of the present invention is used in a liquid crystal display, for example, it is useful for prevention of light leakage in a black display and viewing angle compensation. A polarizing plate with optical compensation layers of the present invention can be used suitably for a VA-mode liquid crystal display. When a polarizing plate with optical compensation layers of the present invention is used for an EL display, it is useful, for example, for preventing reflection from an electrode.

D. Image Display

Figure 3:
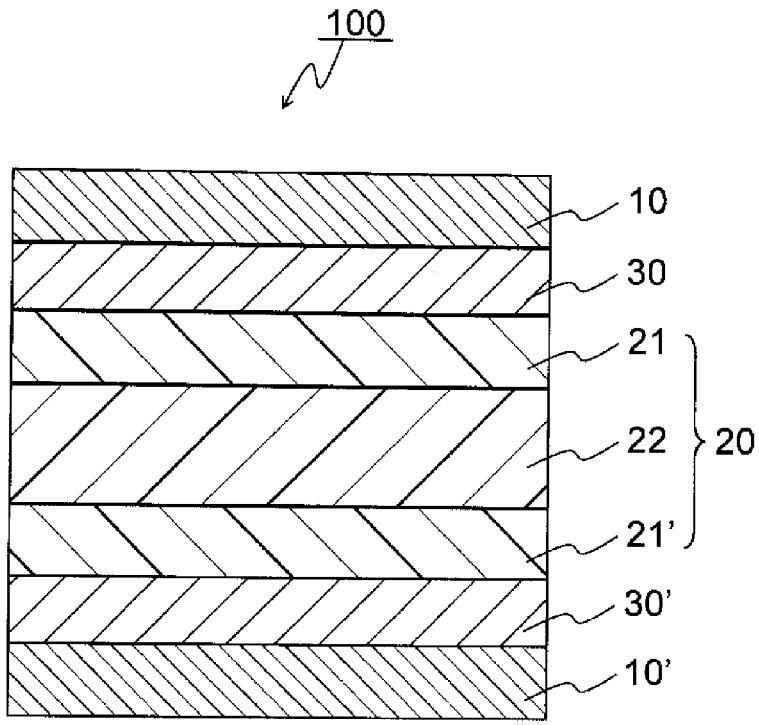
FIG. 3 is a schematic cross-sectional view of an example of the liquid crystal panel according to the present invention.

A liquid crystal display is described as an example of the image display according to the present invention. In this section, a liquid crystal panel that is used in a liquid crystal display is described. For other configurations of the liquid crystal display, any suitable configurations can be employed according to the intended use. In the present invention, a VA-mode liquid crystal display is preferable. The liquid crystal display of the present invention can be of any one of a transmission type, a reflective type, or a semitransparent type. FIG. 3 is a schematic cross-sectional view of one example of the liquid crystal panel according to the present invention. In this section, a liquid crystal panel for a transmission liquid crystal display is described. A liquid crystal panel 100 includes a liquid crystal cell 20, retardation plates 30 and 30' disposed on both sides of the liquid crystal cell 20, and polarizing plates 10 and 10', each of which is disposed on the outer side of each retardation plate. At least one of the polarizing plates 10 and 10' is a polarizing plate with optical compensation layers of the present invention that has been described in sections A and B above. Typically, the polarizing plates 10 and 10' are disposed so that the absorption axes of the polarizers thereof are orthogonal to each other. In the liquid crystal display (liquid crystal panel) of the present invention, it is preferable that when a polarizing plate of the present invention is used for one of the polarizing plates, the polarizing plate of the present invention be disposed on the visible side (upper side). For the retardation plates 30 and 30', any suitable retardation plates are employed according to the intended use and alignment mode of the liquid crystal cell. One or both of the retardation plates 30 and 30' can be omitted depending on the intended use and alignment mode of the liquid crystal cell. Furthermore, when a polarizing plate with optical compensation layers of the present invention is used as a polarizing plate, one or both of the retardation plates 30 and 30' can be omitted. The liquid crystal cell 20 includes a pair of glass substrates 21 and 21' and a liquid crystal layer 22 to serve as a display medium disposed between the substrates. One substrate (active matrix substrate) 21' is provided with a switching element (typified by a TFT) for controlling the electrooptic characteristics of the liquid crystal as well as a scanning line and a signal line for providing this active element with gate signals and source signals, respectively (not shown). The other glass substrate (a color filter substrate) 21 is provided with a color filter (not shown). It is also possible to provide the color filter for the active matrix substrate 21'. The gap (cell gap) between the substrates 21 and 21' is controlled with a spacer (not shown). Each of the substrates 21 and 21' is provided with an alignment film (not shown) made, for example, of polyimide on the side on which it is in contact with the liquid crystal layer 22.

Figure 4:
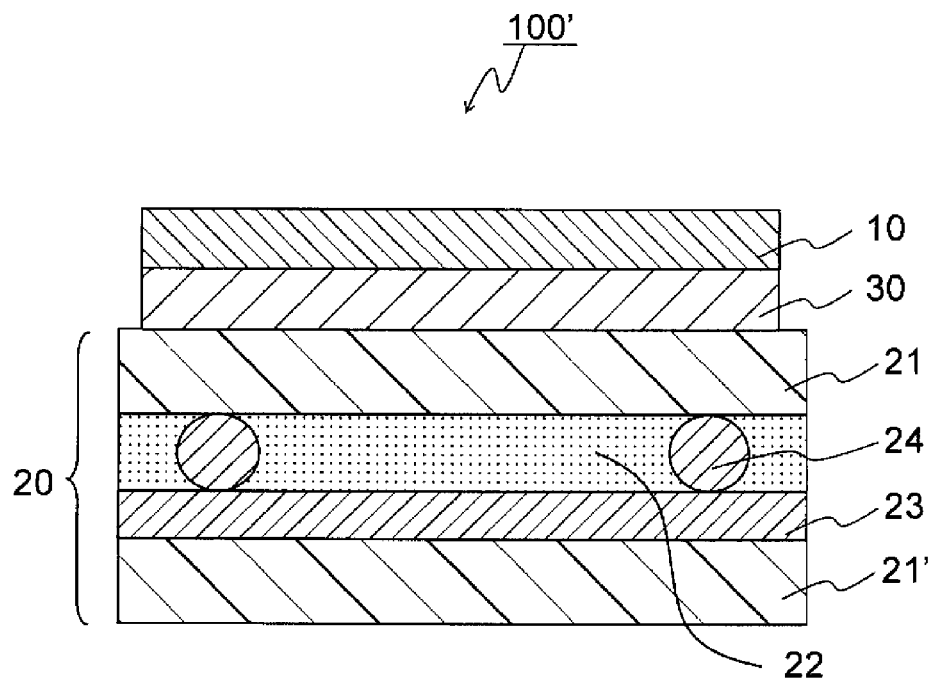
FIG. 4 is a schematic cross-sectional view of another example of the liquid crystal panel according to the present invention.

FIG. 4 is a schematic cross-sectional view of another example of the liquid crystal panel according to the present invention. A liquid crystal panel for a reflective liquid crystal display is described below. A liquid crystal panel 100' includes a liquid crystal cell 20, a retardation plate 30 disposed on the upper side of the liquid crystal cell 20, and a polarizing plate 10 disposed on the upper side of the retardation plate 30. The polarizing plate 10 is a polarizing plate with optical compensation layers of the present invention described in sections A and B above. For the retardation plate 30, any suitable one can be employed according to the intended use and the alignment mode of the liquid crystal cell. The retardation plate 30 can be omitted depending on the intended use and alignment mode of the liquid crystal cell. Furthermore, when a polarizing plate with optical compensation layers of the present invention is used as a polarizing plate, the retardation plate 30 can be omitted. The liquid crystal cell 20 includes a pair of glass substrates 21 and 21' and a liquid crystal layer 22 to serve as a display medium disposed between the substrates. A reflecting electrode 23 is provided on the liquid crystal layer 22 side of the lower substrate 21'. The upper substrate 21 is provided with a color filter (not shown). The interval (cell gap) between the substrates 21 and 21' is controlled with spacers 24.

Figure 5:
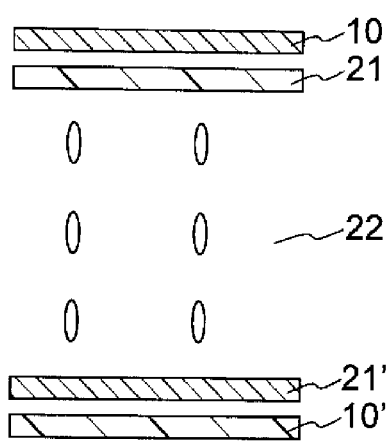
FIGS. 5(a) and 5(b) each are a schematic cross-sectional view for explaining an example of the alignment state of liquid crystal molecules in a liquid crystal layer in the case where a liquid crystal display of the present invention employs a VA mode liquid crystal cell.
Figure 5:
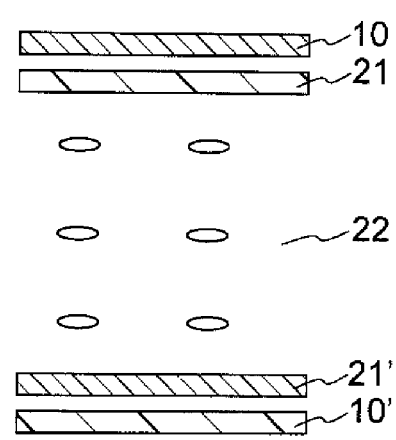

A VA-mode display mechanism is described below. FIGS. 5(a) and 5(b) each are a schematic cross-sectional view for explaining the alignment state of liquid crystal molecules in the VA mode. As shown in FIG. 5(a), the liquid crystal molecules are aligned perpendicular to the surfaces of the substrates 21 and 21' when no voltage is applied. Such vertical alignment can be obtained by providing a nematic liquid crystal with negative dielectric constant anisotropy between the substrates, each of which has a vertical alignment film (not shown) formed thereon. In such a state, when linearly polarized light that has passed through a polarizing plate 10' is allowed to be incident on a liquid crystal layer 22 from the surface of one substrate 21', the incident light travels along the direction of the long axes of vertically aligned liquid crystal molecules. Since no birefringence occurs in the direction of the long axes of the liquid crystal molecules, the incident light travels without changing the direction in which it is polarized and then is absorbed by a polarizing plate 10 having a polarization axis orthogonal to that of the polarizing plate 10'. This allows a dark state display to be obtained when no voltage is applied (normally black mode). As shown in FIG. 5(b), when voltage is applied between electrodes, the long axes of the liquid crystal molecules are aligned in parallel to the substrate surfaces. The liquid crystal molecules exhibit birefringence with respect to linearly polarized light that is incident on the liquid crystal layer 22 in this state, and the polarization state of the incident light varies according to the tilt of the liquid crystal molecules. Light that passes through the liquid crystal layer 22 when a predetermined maximum voltage is applied becomes linearly polarized light, for example, with the direction in which it is polarized being rotated 90 degrees. Accordingly it passes through the polarizing plate 10 and thereby a light state display is obtained. When the state is brought back again to a state where no voltage is applied, an aligning force allows the light state display to return to the dark state display. Furthermore, the tilt of the liquid crystal molecules is controlled by changing the voltage to be applied and thereby the intensity of the light transmitted through the polarizing plate 10 is changed. Thus, a gray-scale display can be obtained.

EXAMPLE

The present invention is described below further in detail using examples but is not limited by the examples. In the examples, respective properties were measured by the following methods.

(1) Measurement of Thickness

The thickness of polarizing plates with optical compensation layers of the examples and comparative examples were measured using a dial gauge manufactured by Ozaki Mfg. Co., Ltd.

(2) Measurement of Contrast Ratio

Liquid crystal panels each were produced using a polarizing plate with optical compensation layers obtained in each example and comparative example. Then each liquid crystal panel was allowed to display a white image (i.e. the absorption axis of the polarizer is parallel) and a black image (i.e. the absorption axis of the polarizer is orthogonal). The viewing angle at a contrast ratio (Co)≧10 was measured in each of the direction perpendicular to the panel surface and diagonal direction, using "EZContrast 160D" (trade name) manufactured by ELDIM. In this measurement, scanning was carried out between 45° and 225° as well as 135° and 315° with respect to the absorption axis of the polarizer disposed on the visible side, and between −60° and 60° with respect to the normal line. Thus, based on a Y value (YW) and a Y value (YB) that were obtained when a white image and a black image were displayed, respectively, the contrast ratio (YW/YB) in a diagonal direction was calculated.

In the examples, a rubbing treatment was carried out under five rubbing conditions in producing the first optical compensation layer (Examples 1 to 5). That is, first, 10 parts by weight of polymerizable liquid crystal monomer (PALIOCOLOR LC242 (trade name), manufactured by BASF AG) exhibiting a nematic liquid crystalline phase that was represented by Formula (7) above and 3 parts by weight of photopolymerization initiator (IRGACURE 907 (trade name), manufactured by Ciba Specialty Chemicals) were dissolved in 40 parts by weight of toluene. Thus, a liquid crystal solution (coating solution) was prepared. On the other hand, the surface of a base film (polyethylene terephthalate (PET) film, with a thickness of 38 μm) was rubbed with rubbing cloth to be subjected to an aligning treatment. This rubbing treatment was carried out under the five conditions (Examples 1 to 5) indicated in Table 1 below using a rubbing apparatus shown in FIG. 7 and FIGS. 8(a) and 8(b) by the aforementioned rubbing method (A). The direction to which the aligning treatment was carried out was clockwise "minus" 45 degrees with respect to the long side of the base film. The liquid crystal solution was applied to this surface that had been subjected to the aligning treatment, and was then dried by heating at 90° C. for two minutes. Thus, the liquid crystal monomers were aligned and thereby a liquid crystal layer was formed on the surface of the base film that had been subjected to the aligning treatment. This liquid crystal layer was irradiated with light at an irradiation intensity of 1 mJ/cm$^2$ using a metal halide lamp, and the liquid crystal monomers in the liquid crystal layer were polymerized. Thus, a first optical compensation layer was formed. The first optical compensation layer had a thickness of 1.2 μm, an in-plane retardation $Re_1$ of 140 nm, and a refractive index distribution of nx>ny=nz. Next, the first optical compensation layer was bonded to a polarizing plate (SEG1425DU (trade name), manufactured by Nitto Denko Corporation), with an isocyanate adhesive (with a thickness of 5 μm) interposed therebetween, and it was transferred through separation and removal of the base film. The slow axis of the first optical compensation layer was "plus" 45 degrees with respect to the absorption axis of the polarizing plate.

TABLE 1

|  | Rubbing Strength (RS) (mm) | The number of times of rubbing (The number of rubbing roles) | Indentation amount (M) (mm) | Radius of rubbing roll (r) (mm) | Rotational speed of rubbing roll (nr) (rpm) | Film conveying rate (v) (mm/sec) |
| --- | --- | --- | --- | --- | --- | --- |
| Ex. 1 | 2618 | 1 | 0.3 | 76.89 | 1500 | 83 |
| Ex. 2 | 3491 | 1 | 0.4 | 76.89 | 1500 | 83 |
| Ex. 3 | 4363 | 1 | 0.5 | 76.89 | 1500 | 83 |
| Ex. 4 | 1745 | 1 | 0.2 | 76.89 | 1500 | 83 |
| Ex. 5 | 873 | 1 | 0.1 | 76.89 | 1500 | 83 |

Then 90 parts by weight of nematic liquid crystal monomer represented by Formula (7) above, 10 parts by weight of chiral dopant represented by Formula (31) above, 5 parts by weight of photopolymerization initiator (IRGACURE 907 (trade name), manufactured by Ciba Specialty Chemicals), and 300 parts by weight of methyl ethyl ketone were mixed together uniformly. Thus, a liquid crystal solution (coating solution) was prepared. Then this liquid crystal solution was applied to a substrate (a biaxially stretched PET film) and was then heat-treated at 80° C. for three minutes. Subsequently, this was irradiated with ultraviolet light to be subjected to a polymerization treatment. Thus, a cholesterically aligned and solidified layer was formed. The cholesterically aligned and solidified layer had a thickness of 2 μm. Next, an isocyanate adhesive (with a thickness of 4 μm) was applied to a principal surface of the cholesterically aligned and solidified layer, and a plastic film layer (TAC film with a thickness of 40 μm) was bonded thereto, with the adhesive being interposed therebetween. Thus, a second optical compensation layer was formed. In the second optical compensation layer, the PET film that served as a base was separated to be removed. The second optical compensation layer had a thickness of 46 μm, an in-plane retardation $Re_2$ of 0.5 nm, and a thickness-direction retardation $Rth_2$ of 160 nm. Subsequently, an acrylic pressure-sensitive adhesive (with a thickness of 20 μm) was applied thereto and thereby a bonding process was carried out. Finally, the second optical compensation layer was punched into a size of 250 mm length and 400 mm width.

The second optical compensation layer (TAC film/cholesterically aligned and solidified layer) was stacked on a laminate formed of the polarizing plate and the first optical compensation layer (λ/4 plate). As described before, they were stacked together in such a manner that the slow axis of the first optical compensation layer was counterclockwise "plus" 45 degrees with respect to the absorption axis of the polarizer. Since the second optical compensation layer had a small in-plane retardation $Re_2$, the polarizer and the second optical compensation layer were not adjusted in angle. The first optical compensation layer and the second optical compensation layer were stacked together with the aforementioned acrylic pressure-sensitive adhesive. Thus, five polarizing plates with optical compensation layers (Examples 1 to 5) were obtained.

<Production of Liquid Crystal Panel>

Figure 6:
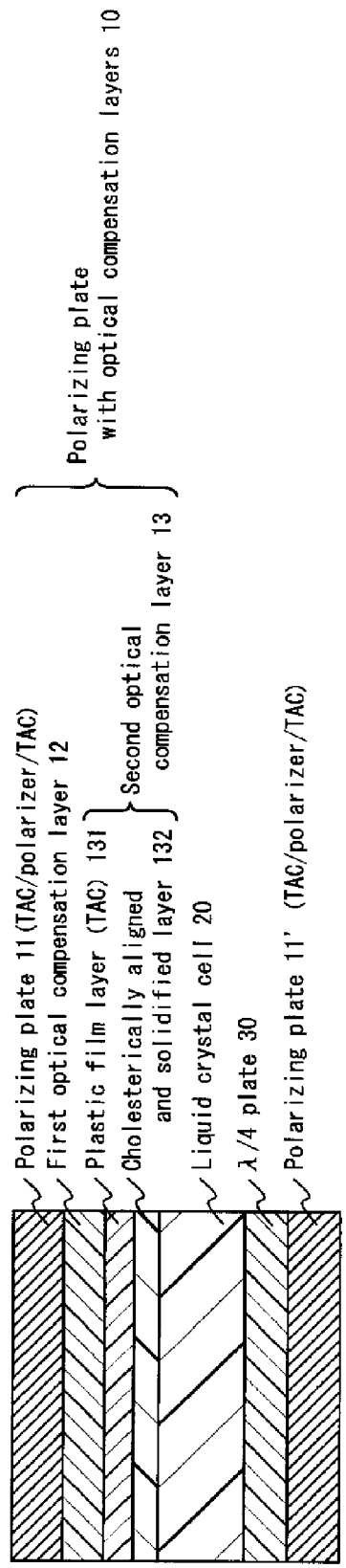
FIG. 6 is a schematic cross-sectional view of a liquid crystal panel according to an example of the present invention.

The polarizing plates with optical compensation layers obtained above each were stacked on a VA-mode liquid crystal cell on the visible side, with an acrylic pressure-sensitive adhesive (with a thickness of 20 μm) being interposed therebetween. Furthermore, a λ/4 plate and a polarizing plate each were stacked in this order on the backlight side of the liquid crystal cell, with an acrylic pressure-sensitive adhesive (with a thickness of 20 μm) being interposed therebetween. Finally, this was punched into a size of 40 mm length and 53 mm width in such a manner that the absorption axis of the polarizer is substantially parallel with the width direction of the polarizing plate with optical compensation layers. Thus, a liquid crystal panel as shown in FIG. 6 was produced. As shown in FIG. 6, this liquid crystal panel is formed of an polarizing plate with optical compensation layers 10 obtained above, the liquid crystal cell 20, the λ/4 plate (retardation plate) 30, and a polarizing plate (polarizer) 11' that are stacked together in this order from the visible side (upper side). The polarizing plate with optical compensation layers 10 is formed of a polarizing plate (polarizer) 11, the first optical compensation layer 12, and the second optical compensation layer 13 that are stacked together in this order from the visible side (upper side). The second optical compensation layer 13 is formed of the plastic film layer (TAC) 131 and the cholesterically aligned and solidified layer 132 that are stacked together in this order from the visible side (upper side). The polarizing plates (polarizers) 11 and 11' each are formed of a polarizer and protective films (TAC) stacked on both sides of the polarizer.

The contrast ratio of this liquid crystal panel was measured. The results of the measurement of the contrast ratio of the liquid crystal panel according to Example 1 is shown in a radar chart in FIG. 9.

Comparative Example 1

A polarizing plate with optical compensation layers was produced in the same manner as in Example 1 except that the order of the first optical compensation layer and the second optical compensation layer that were stacked together was reversed. Using this polarizing plate with optical compensation layers, a liquid crystal panel was produced in the same manner as in Example 1.

The contrast ratio of the liquid crystal panel obtained in Comparative Example 1 was measured. The results thus obtained are shown in a radar chart in FIG. 9.

Figure 9:
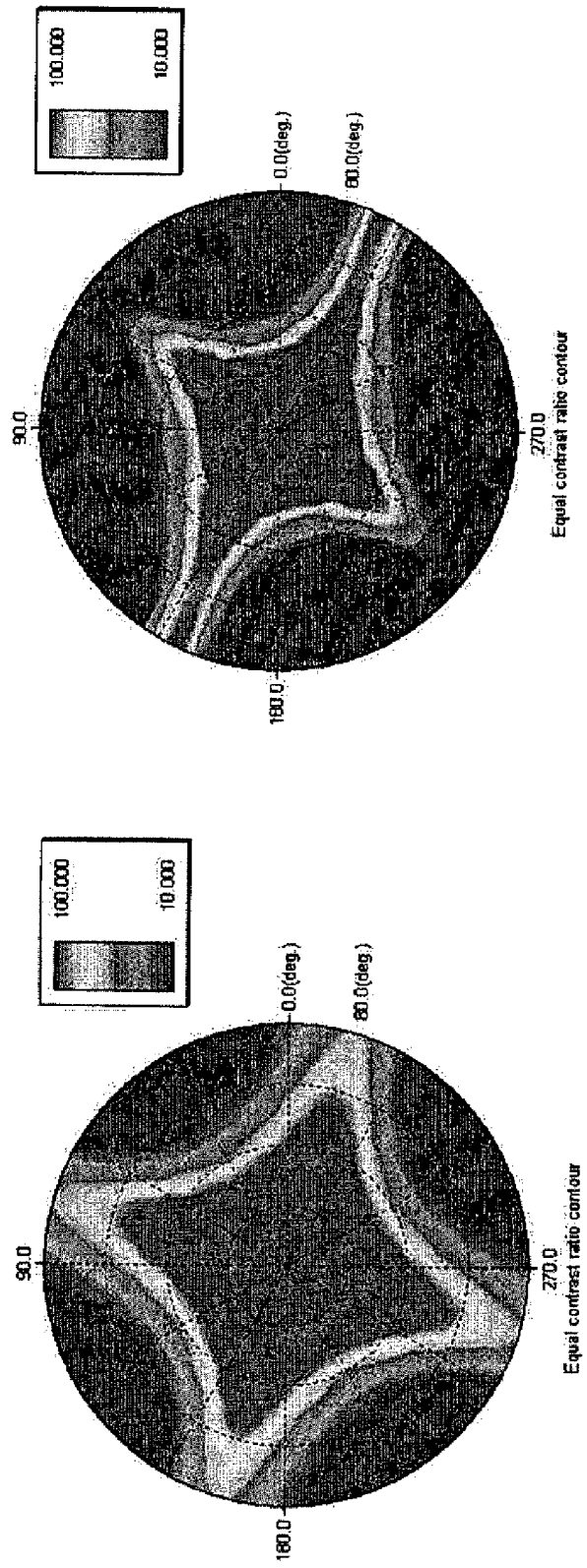
FIG. 9 show radar charts illustrating the contrast ratios of a liquid crystal panel of an example of the present invention and a liquid crystal panel of a comparative example.

As shown in FIG. 9, the liquid crystal panel including the polarizing plate with optical compensation layers of Example 1 was excellent in contrast ratio over a wide range as compared to the liquid crystal panel of Comparative Example. Furthermore, the polarizing plate with optical compensation layers of Example 1 was excellent in viewing angle compensation in the direction perpendicular to the panel surface and the diagonal direction. Similarly, those of Example 2 to 5 also were excellent in contrast ratio and viewing angle compensation as in the case of Example 1.

Accordingly, when a polarizer, a first optical compensation layer (λ/4 plate), and a second optical compensation layer (negative C plate) were disposed in this order from the visible side, excellent viewing angle compensation was obtained particularly in the diagonal direction and circular polarization was obtained in a wide wavelength range. Moreover, it was confirmed that a reduction in thickness, an improvement in brightness, and prevention of degradation in contrast were achieved as compared to conventional one.

Next, in Examples 1 to 5, the alignment state of the liquid crystal compound in forming the first optical compensation layer was evaluated visually. As a result, the alignment states of the liquid crystal compounds according to Examples 1 to 3 were very good, while those of the liquid crystal compounds according to Examples 4 and 5 were in a practically acceptable level although irregularities in alignment were occurred.

The polarizing plate with optical compensation layers of the present invention can be used suitably for various image displays (for example, liquid crystal displays and self-light-emitting displays).

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A polarizing plate with optical compensation layers, comprising:
    a polarizer;
    a first optical compensation layer; and
    a second optical compensation layer,
    the polarizer, the first optical compensation layer, and the second optical compensation layer being stacked together in this order,
    wherein the first optical compensation layer is formed of a liquid crystal compound and has a relationship of nx>ny=nz and an in-plane retardation $Re_1$ in a range of 100 to 170 nm,
    the second optical compensation layer has a relationship of nx=ny>nz and a thickness-direction retardation $Rth_2$ in a range of 30 to 400 nm, and,
    an angle formed between an absorption axis of the polarizer and a slow axis of the first optical compensation layer is in a range of 25 to 65 degrees in a clockwise direction (−) or in a counterclockwise direction (+) with respect to the absorption axis of the polarizer.

2. The polarizing plate with optical compensation layers according to claim 1, wherein the first optical compensation layer has a thickness in a range of 0.5 to 3 μm.

3. The polarizing plate with optical compensation layers according to claim 1, wherein the second optical compensation layer includes a cholesterically aligned and solidified layer with a selective reflection wavelength range of 350 nm or shorter.

4. The polarizing plate with optical compensation layers according to claim 1, wherein the second optical compensation layer has a thickness in a range of 1 to 20 μm.

5. The polarizing plate with optical compensation layers according to claim 1, wherein the second optical compensation layer includes a layer formed of a film containing a resin with an absolute value of photoelastic coefficient of $2\times10^{-11}$ $m^2/N$ or lower and a cholesterically aligned and solidified layer with a selective reflection wavelength range of 350 nm or shorter, and the layer formed of a film containing a resin has a relationship of nx=ny>nz.

6. The polarizing plate with optical compensation layers according to claim 1, wherein the second optical compensation layer comprises a layer formed of a non-liquid crystal polymer.

7. The polarizing plate with optical compensation layers according to claim 6, wherein the non-liquid crystal polymer is at least one selected from the group consisting of polyamide, polyimide, polyester, polyetherketone, polyaryletherketone, polyamide imide, and polyesterimide.

8. The polarizing plate with optical compensation layers according to claim 1, which does not contain a λ/2 plate.

9. A liquid crystal panel, comprising a polarizing plate with optical compensation layers according to claim 1 and a liquid crystal cell,
    wherein a second optical compensation layer is disposed on a side closer to the liquid crystal cell and is disposed on a visible side of the liquid crystal cell.

10. The liquid crystal panel according to claim 9, wherein the liquid crystal cell is a VA mode or an ECB mode.

11. A liquid crystal display, comprising a liquid crystal panel according to claim 9.

12. An image display, comprising a polarizing plate with optical compensation layers according to claim 1.

13. A method of producing a polarizing plate with optical compensation layers according to claim 1, the method comprising:
    producing a first optical compensation layer by applying a liquid crystal compound to a rubbing-treated surface of a long base film that has been subjected to a rubbing treatment to be treated to have alignment, and fixing the alignment,
    wherein the rubbing treatment is carried out by a rubbing method (A) below:
    in a rubbing treatment process where the surface of the long base film is rubbed with a rubbing roll, the long base film is supported and conveyed by a conveyer belt with a metal surface, while a plurality of backup rolls are provided to support a lower surface of the conveyer belt that supports the long base film and to oppose the rubbing roll, and a rubbing strength RS defined by Formula (1) below is set at 800 mm or higher, $$RS = N \cdot M(1 + 2\pi r \cdot nr/v) \quad (1)$$

where N denotes the number of times of rubbing (the number of rubbing rolls) (dimensionless quantity), M indicates an indentation amount (mm) of the rubbing rolls, π denotes a ratio of a circumference of a circle to its diameter, r indicates a radius (mm) of the rubbing roll, nr denotes a rotational speed (rpm) of the rubbing roll, and v indicates a rate of conveying the long base film (mm/sec).

* * * * *